(12) United States Patent
Iribe et al.

(10) Patent No.: US 7,023,164 B2
(45) Date of Patent: Apr. 4, 2006

(54) ROBOT AND OVER-CURRENT PROTECTION DEVICE FOR A ROBOT

(75) Inventors: Masatsugu Iribe, Tokyo (JP); Tomohisa Moridaira, Tokyo (JP); Hiroshi Yamaguchi, Nagano (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 11/002,627

(22) Filed: Dec. 2, 2004

(65) Prior Publication Data
US 2005/0179416 A1   Aug. 18, 2005

(30) Foreign Application Priority Data
Dec. 3, 2003   (JP)   ............................. 2003-403932

(51) Int. Cl.
*G05B 9/02*   (2006.01)
(52) U.S. Cl. ................. 318/563; 318/568.12; 388/903; 361/5; 361/23; 361/24; 361/25
(58) Field of Classification Search ................ 318/563, 318/568.12; 388/903; 361/5, 23, 24, 25
See application file for complete search history.

(56) References Cited

U.S. PATENT DOCUMENTS

| | | | | |
|---|---|---|---|---|
| 4,714,865 A | * | 12/1987 | Chin et al. ................. | 318/563 |
| 4,807,153 A | * | 2/1989 | Onaga et al. ............... | 700/256 |
| 4,864,206 A | * | 9/1989 | Onaga et al. ............ | 318/568.11 |
| 4,874,997 A | * | 10/1989 | Daggett et al. ........... | 318/568.1 |
| 4,902,944 A | * | 2/1990 | Daggett et al. ........ | 318/568.11 |
| 4,925,312 A | * | 5/1990 | Onaga et al. ............... | 700/261 |
| 5,086,491 A | * | 2/1992 | Cuneo ......................... | 388/811 |
| 5,144,211 A | * | 9/1992 | Daggett et al. ........ | 318/568.11 |
| 6,438,454 B1 | * | 8/2002 | Kuroki ........................ | 700/245 |
| 6,463,356 B1 | * | 10/2002 | Hattori et al. ............... | 700/245 |
| 6,762,745 B1 | * | 7/2004 | Braun et al. ................. | 345/156 |
| 6,832,131 B1 | * | 12/2004 | Hattori et al. ............... | 700/245 |

* cited by examiner

*Primary Examiner*—Rita Leykin
(74) *Attorney, Agent, or Firm*—Frommer Lawrence & Haug LLP; William S. Frommer; Thomas F. Presson

(57) ABSTRACT

It is so arranged in a robot as to monitor the over-current state of each motor and that of two more than two motors when put together by seeing the total current value of the motors being monitored in parallel with absorption of both the static load torque and the dynamic load torque of each actuator/motor. Additionally, it is so arranged as to check if each of the predetermined unit members including the arm sections and the leg sections of the robot is in an over-current state or not and also if the entire robot is in an over-current state or not, while each of the motors are not in an over-current state.

12 Claims, 32 Drawing Sheets

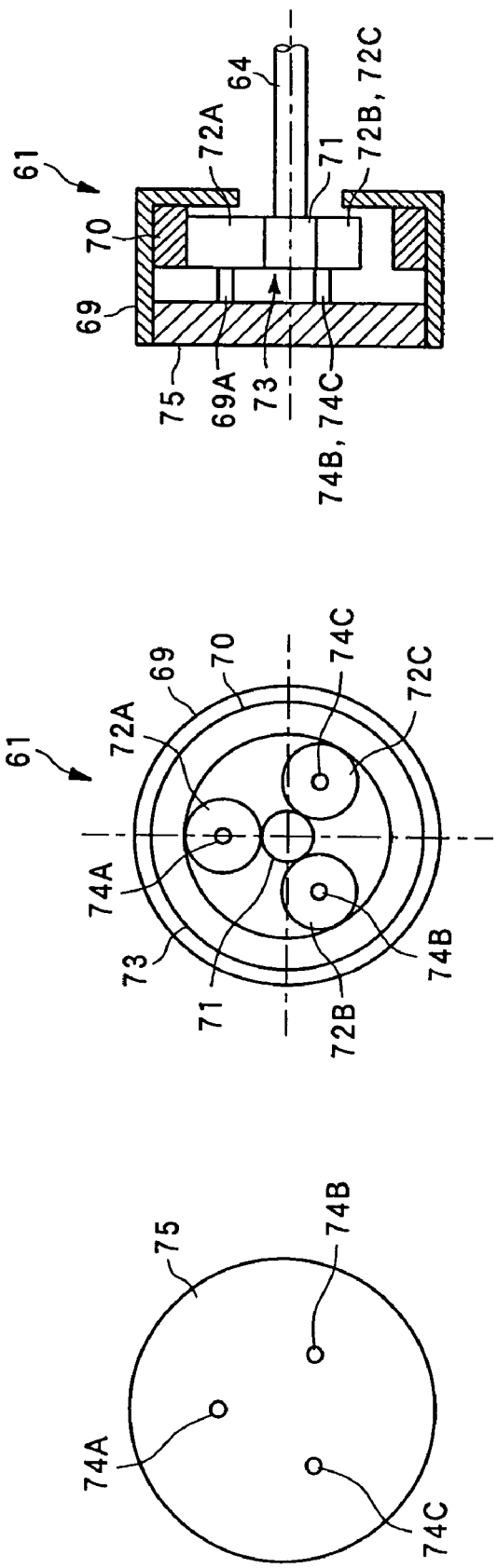

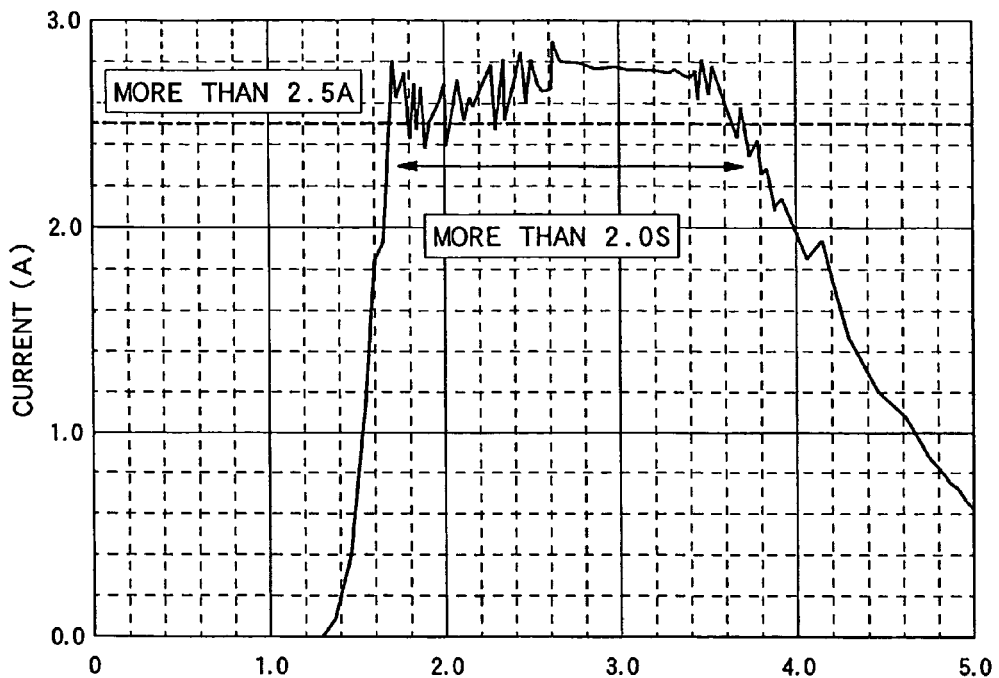
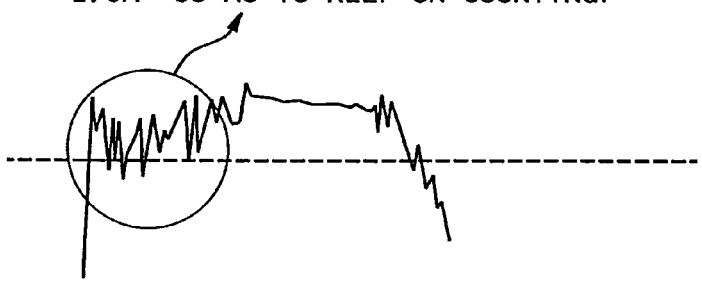
IF THE SIGNAL CROSSES THE THRESHOLD VALUE OF 2.5A DUE TO CHATTERING, DISREGARD IT IF IT IS FOR LESS THAN 40 MS AND ASSUME IT TO BE NOT LESS THAN 2.5A SO AS TO KEEP ON COUNTING.
FIG. 27

OBSTACLE OBSTRUCTING
THE STANDING UP MOTION

ROBOT AND OVER-CURRENT PROTECTION DEVICE FOR A ROBOT

BACKGROUND OF THE INVENTION

1. Field of the Invention

This invention relates to a robot comprising a plurality of joint axes, links coupling the joints and actuators for driving the joint axes and adapted to operate by supplying a drive current to the actuators. More particularly, the present invention relates to a robot adapted to prevent an over-current from flowing to any of its actuators during an operation and also to an over-current protection device to be used for such a robot.

Still more particularly, the present invention relates to a robot adapted to prevent an over-current from flowing to any of its actuators when an excessively heavy load is applied to the related joint axes and also to an over-current protection device to be used for such a robot. Still more particularly, the present invention relates to a robot adapted to prevent an over-current from flowing to any of its actuators when a heavy load that exceeds the permissible limit of the entire robot is applied to any of its joint axes and also to an over-current protection device to be used for such a robot.

This application claims priority of Japanese Patent Application No. 2003-403932, filed on Dec. 3, 2003, the entirety of which is incorporated by reference herein.

2. Description of Related Art

A machine device adapted to move in a manner resembling to motions of human being by means of electric and/or magnetic operations is referred to as "robot". It is said that the word "robot" derives from a Slavic word "ROBOTA (slave machine)". In Japan, robots started to become popular in the later 1960s, although many of them were industrial robots such as manipulators and transfer robots installed for the purpose of automating productive operations of factories and saving man power. Research and development efforts have been paid in recent years on mobile robots that are equipped with movable legs. Expectations are high for such mobile robots in practical applications. Two-legged mobile robots modeled after human motions are referred to humanoid robots.

While two-legged robots that are based on erect bipedalism are accompanied by problems of instability and difficulty of attitude control and walk control if compared with crawler type robots and four-legged or six-legged robots, they provide advantages including that they can adapt themselves to walking surfaces with obstacles and undulations on the way such as unleveled ground, and discontinued walking surfaces such as staircases and ladders to be stepped up and down so that they can move in a flexible manner.

Legged mobile robots generally have a large number of degrees of freedom of joints and are adapted to realize motions of joints by means of motors of actuators. More specifically, the link of an arm or a leg, which is a structure member of a robot, is coupled at an end thereof to the output shaft of a motor by way of a reduction gear and at the other end thereof to another motor for driving the corresponding neighboring joint. Additionally, the rotary position and the quantity of revolution of each motor are taken out for servo control in order to reproduce a desired pattern of motion and also for attitude control.

Currently, servo motors are generally used for realizing certain degrees of freedom of each joint of a robot. This is because servo motors are easy to handle and compact and show a high torque besides they are highly responsive. Particularly, AC servo motors are brushless and maintenance-free motors and hence can be applied to joint actuators of various automotive machines that can move and work in an unmanned work space such legged robots adapted to freely walk around. An AC servo motor is formed by arranging a permanent magnet and a coil having a plurality of phases respectively at the rotor side and at the stator side so as to generate a rotary torque at the rotor by means of a sinusoidal flux distribution and a sinusoidal wave current.

A sophisticated legged mobile robot can typically autonomously walk and perform various operations by using the legs. Additionally, such a robot can stand up from a posture of lying on the face or on the back. It can also hold an object by hand and carry it to some other place. On the other hand, when such a robot falls on the floor or collides with an object on the floor on the intended route of movement, some or all of the joint actuators of the robot may be subjected to a tremendously excessive load.

The machine can be broken, plastically deformed or otherwise fatally damaged by such an excessive load. Therefore, it may be important for the motors of the joint actuators of a robot to incorporate a mechanism for absorbing such a load.

FIG. 1 of the accompanying drawings schematically shows a known robot, which is illustrated as a simple model. The robot drives a motor 120 under the control of a host controller (not shown) and the output torque of the motor 120 is applied to a link 122 by way of gear 121 so as to drive a movable part thereof.

In the illustrated instance, a torque limiter is arranged between the gear 121 and the link 122 so that it is possible to prevent the output shaft of the motor 120 from being deformed and the motor 120 from being otherwise damaged by any impact externally applied thereto as the torque limiter absorbs the impact.

Various torque limiters (or servo savers) that can be used for such applications have hitherto been proposed [see, inter alia, Japanese Utility Model Application Laid-Open Publication No. 60-192893 (FIGS. 1 and 2)]. FIG. 2 schematically illustrates a torque limiter of the type under consideration, showings its configurations.

The illustrated torque limiter 130 comprises semi-annular first and second friction plates 132A, 132B arranged in the inside of an annular body 131 that is rigidly fitted to a link 135. The first and second friction plates 132A, 132B are rigidly fitted to the output shaft 134 of a motor by way of resilient bodies 133, which may be pieces of rubber or compression coil springs. Then, the first and second friction plates 132A, 132B are pressed against the inner wall surface of the annular body 131 by the resilient bodies 133 under pressure of a predetermined level.

In the illustrated torque limiter 130, the annular body 131 can be rotated integrally with the output shaft 134 of the motor by the frictional force that is generated between the first and second friction plates 132A, 132B and the annular body 131 in normal operating conditions. On the other hand, when the annular body 131 is subjected to a large load as a result of the impact applied to the link 135 and the load is greater than the static frictional force between the first and second friction plates 132A, 132B and the annular body 131, the annular body 131 slides on the first and second friction plates 132A, 132B so that the output shaft 134 of the motor is not subjected to a load that is greater than the dynamic frictional force between the annular body 131 and the first and second friction plate 132A, 132B.

However, such conventional torque limiters 130 are accompanied by a problem that the coefficient of static friction between the annular body 131 and the first and second friction plates 132A, 132B shows a large dispersion among individual torque limiters if they are manufactured according to same numerical specifications so that it is difficult to establish a design margin for the entire robot in terms of the coefficient of static friction.

Additionally, with such conventional torque limiters 130, the coefficient of static friction between the annular body 131 and the first and second friction plates 132A, 132B can easily change as a function of temperature. Thus, it is difficult to handle them also from the viewpoint of the coefficient of static friction.

Still additionally, since conventional torque limiters 130 have a rather complex and bulky mechanical configuration as described, it is difficult to make them lightweight. Then, it is difficult to reduce the size and weight of a robot that comprises a large number of motors.

Furthermore, an over-current may flow to the actuators for driving some of the joints of a robot in an attempt to make the robot move according to the command given to it when an excessively large load torque is applied to any of the joints. Such over-current makes the actuators operate faultily.

For example, if individual actuators do not show any over-current by themselves, the total electric current flowing to a plurality of actuators can exceed the permissible level of the entire system. Particularly, in the case of a robot whose bodily components are driven to move in a coordinated manner under control, the entire system requires over-current protection because, when a joint is subjected to an overload, the excessive load is often distributed to all the body of the robot in order to avoid an over-current condition.

SUMMARY OF THE INVENTION

In view of the above-identified circumstances, it is therefore an object of the present invention to provide a robot and an over-current protection device for a robot that can effectively prevent an over-current from flowing in any of the actuators of the robot while the robot is in operation.

Another object of the present invention to provide a robot and an over-current protection device for a robot that can effectively prevent an over-current from flowing in any of the actuators of the robot when any of the joint axes of the robot is subjected to an excessive load.

Still another object of the present invention is to provide a robot and an over-current protection device for a robot that can effectively prevent an over-current from flowing in the robot beyond the permissible level of the entire robot when any of the joint axes of the robot is subjected to an excessive load.

In an aspect of the present invention, the above objects are achieved by providing a robot having a plurality of movable joint sections, the robot comprising: a drive power source for driving the robot; a plurality of actuators adapted to operate by the supply current from the drive power source for respectively driving the plurality of movable joint sections; a monitoring means for monitoring the output of the drive power source; a power source abnormality detecting means for detecting any of a plurality of power source abnormal conditions according to the output of the power source as monitored by the monitoring means; and an operation control means for conducting an protective operation corresponding to the power source abnormal condition detected by the power source abnormality detecting means.

Generally, a robot is made to comprise a plurality of joint axes, links coupling any two of the joints and actuators for driving the respective joint axes. When an excessive load torque is applied to any of the joints, an over-current may flow to the actuator for driving the joint in an attempt to make the robot move according to the command given to it. Such an overload makes the actuator operate faultily and the over-current gives rise to a power source abnormality, which by turn causes the robot to operate faultily.

For example, if the actuator successfully avoids an over-current state by itself, there may be occasions where the drive power source for driving the robot falls into an over-current state when judged on the basis of a plurality of actuators. Therefore, it may be necessary to protect the robot against over-currents as a whole apart from the necessity of over-current protection for each of the actuators.

Thus, according to the invention, it is so arranged as to monitor the over-current state of each motor and that of two more than two motors when put together by seeing the total current value of the motors being monitored in parallel with absorption of both the static load torque and the dynamic load torque of each actuator/motor. Additionally, it is so arranged as to check if each of the predetermined unit members including the arm sections and the leg sections of the robot is in an over-current state or not and also if the entire robot is in an over-current state or not, while each of the motors are not in an over-current state.

As for the actuators then, if any of the actuators is detected to be in an overload state or an over-current state is detected for an actuator or a combination of a plurality of actuators, a protective operation is conducted for the actuator or the actuators, although the operation may vary depending on the over-current state. When an over-current is detected for a combination of a plurality of actuators, a protective operation is conducted not for individual actuators but for the entire machine in order to avoid dangers that may arise as a result of the over-current state. The protective operation may be breaking the supply of electric current to the related group of actuators or the entire machine, deprivation of power from the related group of actuators or the entire machine and/or protection of the memory against the possible loss of memory due to the break of the supply of electric current. A motor may be deprived of power by reducing the generated torque to nil and/or by regulating the gain and reducing the viscous resistance of an actuator.

For instance, the power source abnormality detecting means may detect a serious abnormal condition of the power source as the output current of the drive power source exceeds a predetermined level. Then, the operation control means suspends the operation of the drive power source in response to the serious abnormal condition of the drive power source.

The power source abnormality detecting means may detect a light over-current state when a condition where the electric current being supplied to the different sections in the robot is higher than a first threshold value but lower than a second threshold value continues for more than a predetermined period of time. In such a case, the operation control means carries out a predetermined shutdown operation and then suspends the operation of the drive power source in response to the light over-current state.

The power source abnormality detecting means may detect a heavier over-current state when a condition where the electric current being supplied to the different sections in the robot is higher than the second threshold value for a period of time shorter than the predetermined period of time. In such a case, the operation control means caries out a minimal shutdown operation and then suspends the operation of the drive power source in response to the heavier over-current state.

The term of "shutdown operation" as used herein includes a memory protecting operation of protecting the contents of the memory that stores control data. The shutdown operation may be carried out stepwise in such a way that, during the period until the drive power source is shutdown, firstly the power supply line other than that necessary for the operation of the entire control system of the entire body of the robot is shutdown and secondly a memory protecting operation is conducted so that the entire power supply may safely be turned off finally.

When the robot falls in a heavy over-current state, the shutdown operation is not carried out stepwise but the entire power supply is turned off in a shorter period by carrying out only the minimum operations such as memory protection.

When the robot falls in a most heavy over-current state, the shutdown operation is not carried out but the entire power supply is turned off to avoid a serious situation.

Thus, the invention provides an excellent robot and an effective over-current protection device that can advantageously prevent an over-current from flowing to any of the actuators of a robot while the robot is in operation.

Additionally, the invention provides an excellent robot and an effective over-current protection device that can advantageously prevent an over-current from flowing to any of the actuators of a robot when an excessive large load is applied to any of the joint axes of the robot.

Still additionally, the invention provides an excellent robot and an effective over-current protection device that can advantageously prevent an electric current from flowing to any of the actuators of a robot beyond the permissible level of the entire robot when an excessive load is applied to any of the joint axes of the robot.

The other objects, features and advantages of the present invention will become apparent from the following description given by referring to the accompanying drawings that illustrate a preferred embodiment of the invention.

BRIEF DESCRIPTION OF THE DRAWINGS

FIGS. 14A to 14C are schematic illustrations of the configuration of torque amplifier section 61 of the robot 1;

FIG. 27 is a schematic illustration of an exemplary result of torque detection;

DETAILED DESCRIPTION OF THE PREFERRED EMBODIMENT

Now, the present invention will be described in greater detail by referring to the accompanying drawings that illustrate a preferred embodiment of the invention.

A. Configuration of the Embodiment of Robot

A legged mobile robot that operates on the principle of erect bipedalism is a structure comprising a base body and four limbs fitted to the base body. The expression of "base body" as used herein refers to a part of the trunk section of the robot that is the object of control and defined near the pelvis link for linking the left and right hip joints or at the trunk where the center of gravity of the entire robot is located or the operable mass is maximal. The operable mass as used herein refers to the mass of the members that can be moved at a same time in the robot. The member where the operable mass is maximal is the movable member of the robot that shows the largest mass (for example, the member showing the largest mass that is not movable is not the member where the operable mass is maximal).

Figure 3:
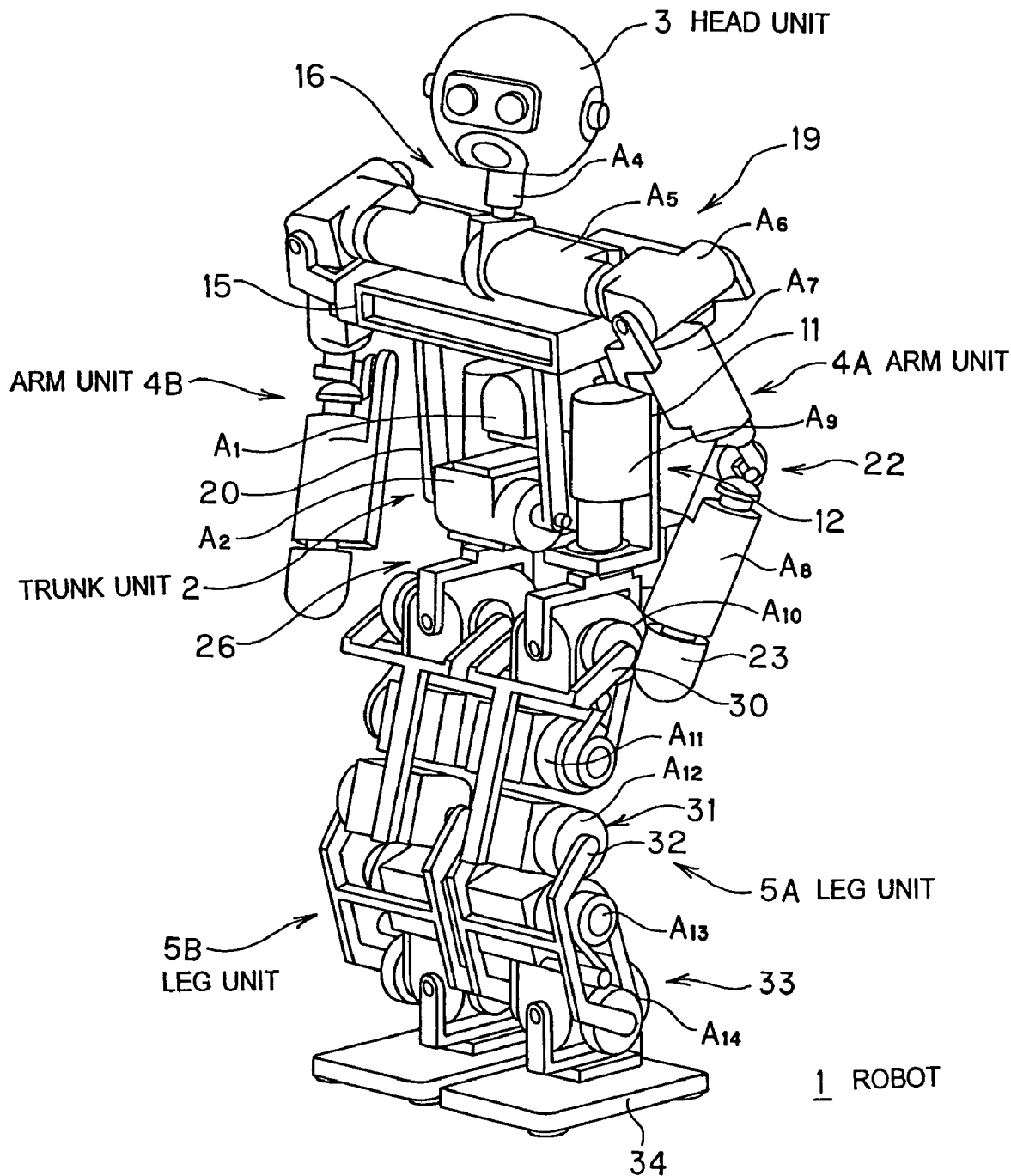
FIG. 3 is a schematic perspective view of an embodiment of robot 1 according to invention, illustrating the external configuration thereof.
Figure 4:
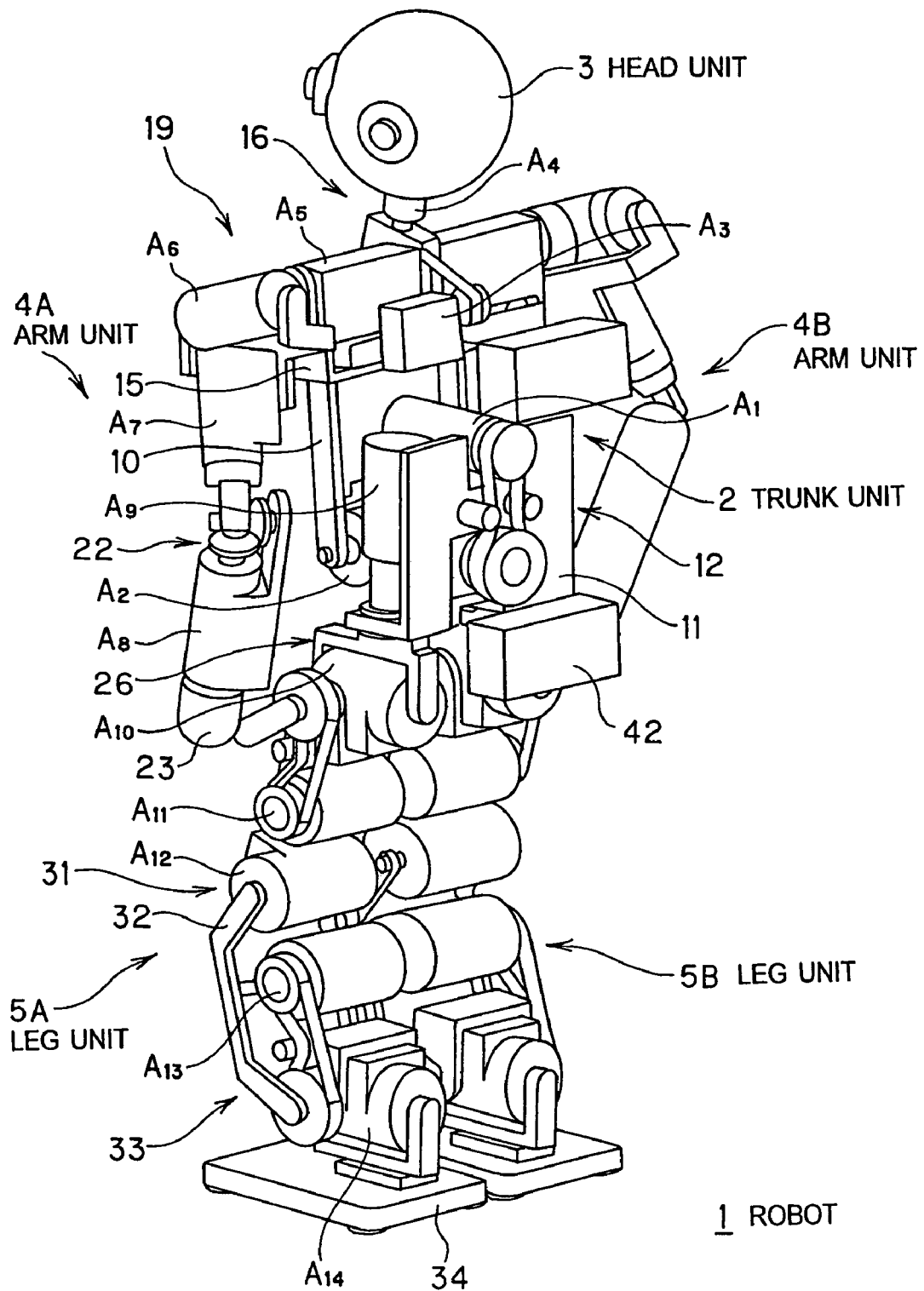
FIG. 4 is another schematic perspective view of the embodiment of robot 1, also illustrating the external configuration thereof.
Figure 5:
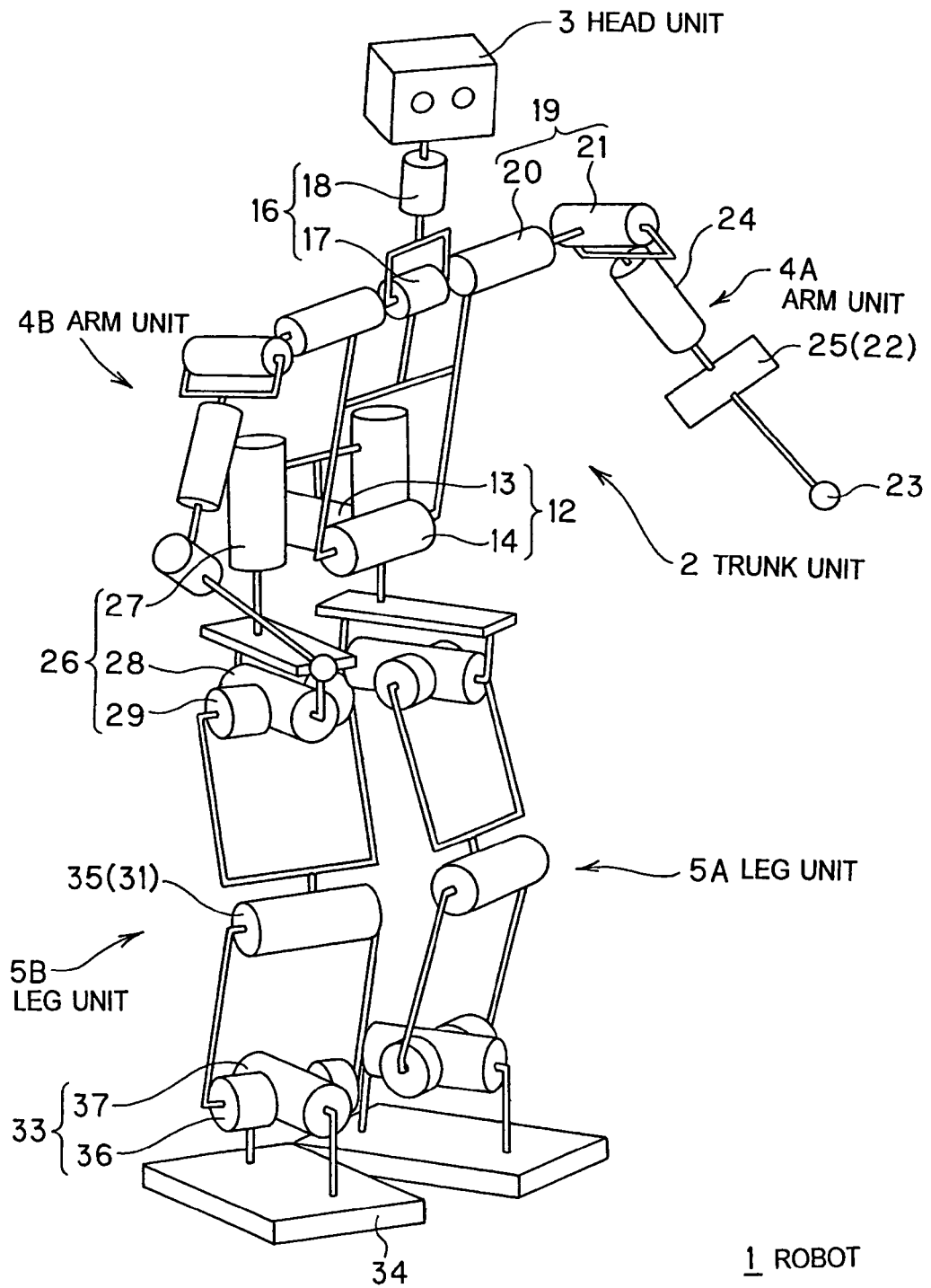
FIG. 5 is a diagrammatic perspective view of the embodiment of robot 1, illustrating the external configuration thereof.

FIGS. 3 and 4 schematically illustrate an embodiment of legged mobile robot according to the invention, showing the entire external configuration thereof. FIG. 5 is a diagrammatic perspective view of the embodiment of robot, illustrating the degrees of freedom of the members of the robot. Throughout FIGS. 3 through 5, reference symbol 1 denotes the entire bipedal robot. A head unit 3 is arranged on the trunk unit 2 of the robot 1 and arm units 4A, 4B, which are structurally identical, are arranged respectively at predetermined left and right upper positions of the trunk unit 2, while leg units 5A, 5B, which are also structurally identical, are arranged respectively at predetermined left and right lower positions of the trunk unit 2.

The trunk unit 2 is formed by linking a frame 10 that operates as trunk upper part and a hip base 11 that operates as trunk lower part by way of a hip joint mechanism 12. The trunk upper part can be driven to rotate independently around roll shaft 13 and pitch shaft 14 that are perpendicular to each other as shown in FIG. 5 by driving respective actuators $A_1$, $A_2$ of the hip joint mechanism 12 rigidly secured to the hip base 11 that is the trunk lower part.

Meanwhile, the head unit 3 is fitted to a top center position of shoulder base 15, which is rigidly secured to the top of the frame 10, by way of a neck joint mechanism 16. The head unit 3 can be driven to rotate independently around pitch shaft 17 and yaw shaft 18 that are perpendicular to each other as shown in FIG. 5 by driving respective actuators $A_3$, $A_4$ of the neck joint mechanism 16.

On the other hand, the arm units 4A, 4B are fitted respectively to left and right predetermined positions of the shoulder base 15 by way of respective shoulder joint mechanisms 19. They can be driven to rotate independently and respectively around left pitch shaft 20 and left roll shaft 21, which are perpendicular to each other, and right pitch shaft 20 and right roll shaft 21, which are also perpendicular to each other as shown in FIG. 5, by driving respective combinations of actuators $A_5$, $A_6$ and actuators $A_9$, $A_{10}$ of the respective shoulder joint mechanisms 19.

In the illustrated instance, actuators $A_8$ and $A_{12}$ that form the forearm sections of left and right arm units 4A, 4B are linked respectively to the output shafts of actuators $A_7$ and $A_{11}$ that form the upper arm sections by way of elbow joint mechanisms 22 and hand sections 23 are fitted respectively to the front ends of the forearm sections. Thus, the forearm sections of the left and right arm units 4A, 4B can be driven to rotate respectively around yaw shafts 24 as shown in FIG. 5 by driving the actuators $A_7$ and $A_{11}$. Additionally, the forearm sections can be driven to rotate respectively around pitch shafts 25 as shown in FIG. 5 by driving the actuators $A_8$ and $A_{12}$.

The leg units 5A, 5B are fitted respectively to left and right predetermined positions of the hip base 11 that operates as trunk lower part by way of respective hip joint mechanisms 26. They can be driven to rotate independently and respectively around left yaw shaft 27, left roll shaft 28 and left pitch shaft 29, which are perpendicular to each other, and right yaw shaft 27, right roll shaft 28 and right pitch shaft 29, which are also perpendicular to each other as shown in FIG. 5, by driving respective combinations of actuators $A_{13}$ through $A_{18}$ and actuators $A_{19}$ through $A_{24}$ of the respective hip joint mechanisms 26.

In the illustrated instance, frames 32 that form respective shank sections are linked respectively to the lower ends of frames 30 that form respective thigh sections by way of respective knee joint mechanisms 31, while foot sections 34 are linked respectively to the lower ends of the frames 32 by way of respective ankle joint mechanisms 33. Thus, the shank sections of the left and right leg units 5A, 5B can be driven to rotate respectively around pitch shafts 35 as shown in FIG. 5 by driving the actuators $A_{16}$ and $A_{22}$ that form knee joint mechanisms 31. Additionally, the foot sections 34 can be driven to rotate respectively around left pitch shaft 36 and left roll shaft 37, which are perpendicular to each other, and right pitch shaft 36 and right roll shaft 37, which are also perpendicular to each other, as shown in FIG. 5 by driving respective combinations of actuators $A_{17}$ and $A_{18}$ and actuators $A_{23}$ and $A_{24}$ of the respective ankle joint mechanisms 33.

Figure 6:
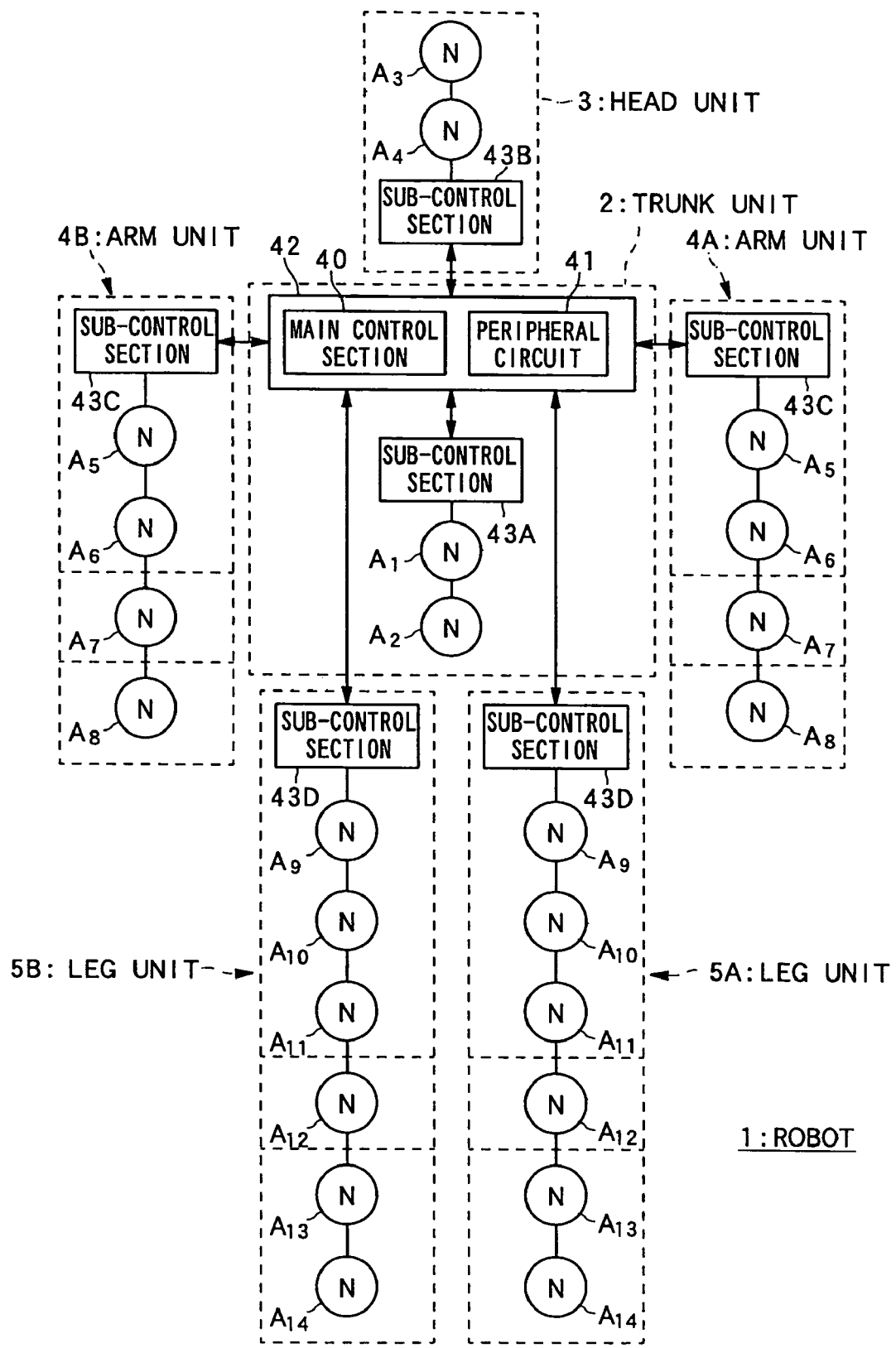
FIG. 6 is a schematic block diagram of the embodiment of robot 1, illustrating the internal configuration thereof.

FIG. 6 is a schematic block diagram of the legged mobile robot 1, illustrating the internal configuration of the control system thereof. A control unit 42 that contains a main control section 40 for controlling the operations of the entire robot 11, a peripheral circuit section 41 including a power supply circuit and a communication circuit and a battery 45 is arranged at the back surface side of the hip base 11 that operate as trunk lower part of the trunk unit 2.

Figure 7:
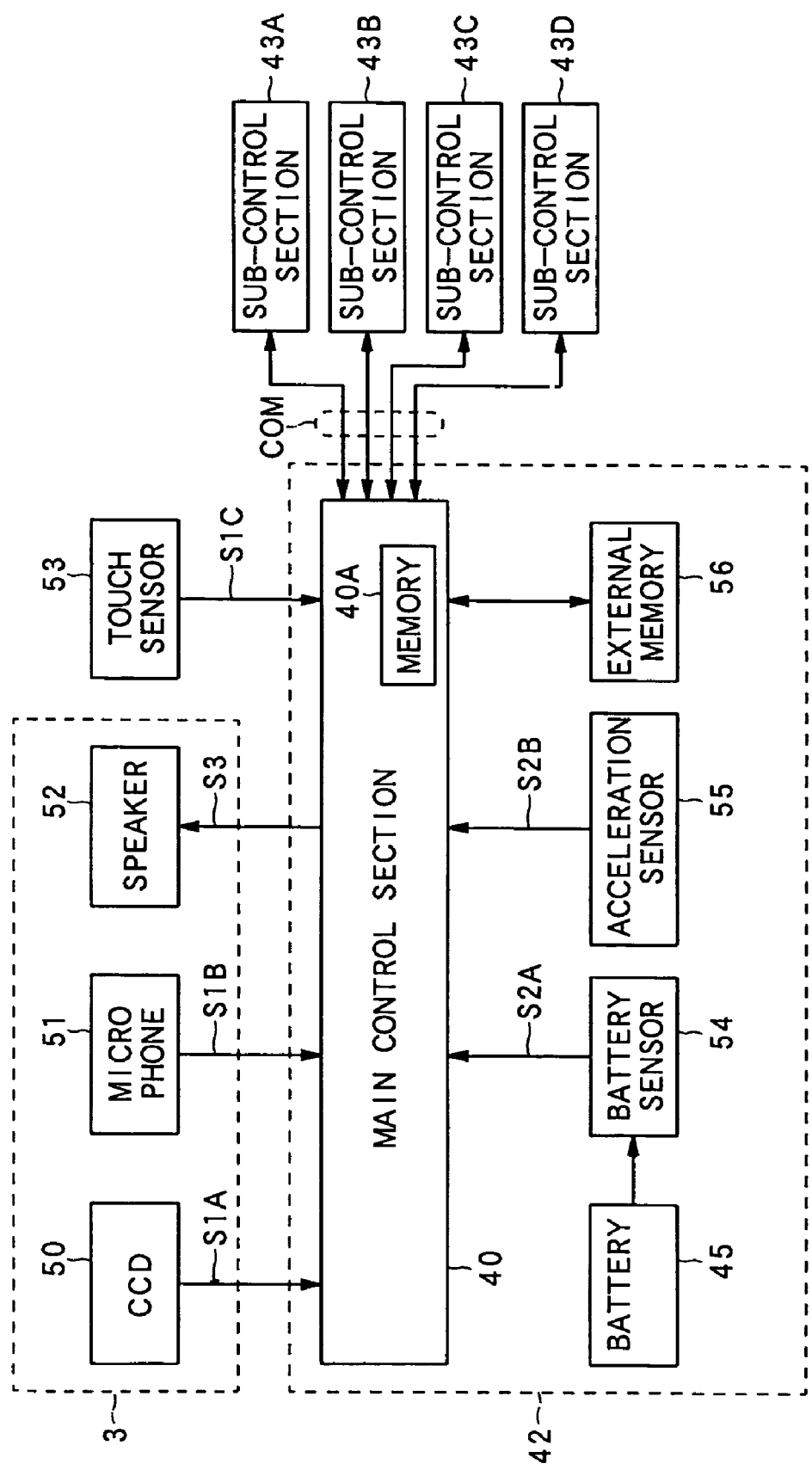
FIG. 7 is another schematic block diagram of the embodiment of robot 1, also illustrating the internal configuration thereof.

FIG. 7 is another schematic block diagram of the legged mobile robot 1, illustrating the internal configuration of the control unit 42. The control unit 42 is connected to sub-control sections 43A through 43D, which are arranged in the respective component units (including the trunk unit 2, the head unit 3, the arm units 4A, 4B, and the leg units 5A, 5B), and adapted to supply necessary supply voltages to and exchange data with the respective sub-control sections 43A through 43D.

The sub-control sections 43A through 43D are connected to the related actuators $A_1$ through $A_{24}$ in the corresponding component units and adapted to control the actuators $A_1$ through $A_{24}$ in the component units according to the control commands given to them from the main control section 40 so as to bring them into respective specified states.

As shown in FIG. 7, the head unit 3 is provided with various sensors including CCD (charge coupled device) cameras 50 that operate as "eyes" of the robot 1 and microphones 51 that operate as "ears" of the robot 1 and output devices including a speaker 52 that operates as "mouth" of the robot 1, which are arranged at respective predetermined positions. The surfaces of the hand sections 23 and the bottom surfaces of the foot sections 34 are provided with touch sensors 53 that are external sensors, while internal sensors including a battery sensor 54 and an acceleration sensor 55 are arranged in the control unit 42.

The CCD cameras 50 pick up an image of the surroundings of the robot 1 and transmit the obtained image signal S1A to the main control section 40. The microphones 51 collect various external sounds and transmit the obtained sound signal S1B to the main control section 40. The touch sensors 53 detect physical approaches from the user and physical contacts of the robot 1 with external objects and transmit the obtained result as pressure detection signal S1C to the main control section 40. The battery sensor 54 detects the remaining power of the battery 45 that operates as main power source at the end of each predetermined period and transmits the obtained battery remaining power detection signal S2A to the main control section 40. The acceleration sensor 56 detects the accelerations in the three axial directions (x-axis, y-axis and z-axis) at the end of each predetermined period and transmits the obtained acceleration detection signal S2B to the main control section 40.

The main control section 40 judges the situation of the surroundings, that of the inside of the robot 1 and the contacts, if any, with external objects according to the external sensor outputs including the image signal S1A, the sound signal S1B and the pressure detection signal S1C that are supplied to it respectively from the CCD cameras 50, the microphones 51 and the touch sensors 53 and the internal sensor outputs including the battery remaining power detection signal S2A and the acceleration detection signal S2B that are supplied to it respectively from the battery sensor 54 and the acceleration sensor 55.

Then, the main control section 40 decides the subsequent action according to the outcome of the judgment, the control program stored in advance in internal memory 40A and the various control parameters stored in external memory 56 that is mounted at the time and transmits the control commands that reflect the decision to the corresponding ones of the sub-control sections 43A through 43D. As a result, the corresponding ones of the actuators $A_1$ through $A_{24}$ are driven according to the control commands under the control of the sub-control sections 43A through 43D so that the robot 1 realizes the decided action that may be a motion of turning the head unit 3 up and down and/or left and right, a motion of turning up and down the arm units 4A, 4B and/or a walking motion of the robot 1.

The main control section 40 recognizes the contents of the speech made by the user by way of a voice recognition process executed for the sound signal S1B and outputs a sound signal S3 that corresponds to the outcome of recognition to the speaker 52 so as to output a synthetic voice to the outside and dialog with the user.

In this way, the robot 1 can autonomously behave in response to the situation of the surroundings and that of the inside of the robot 1 and entertain a dialog with the user.

Figure 33:
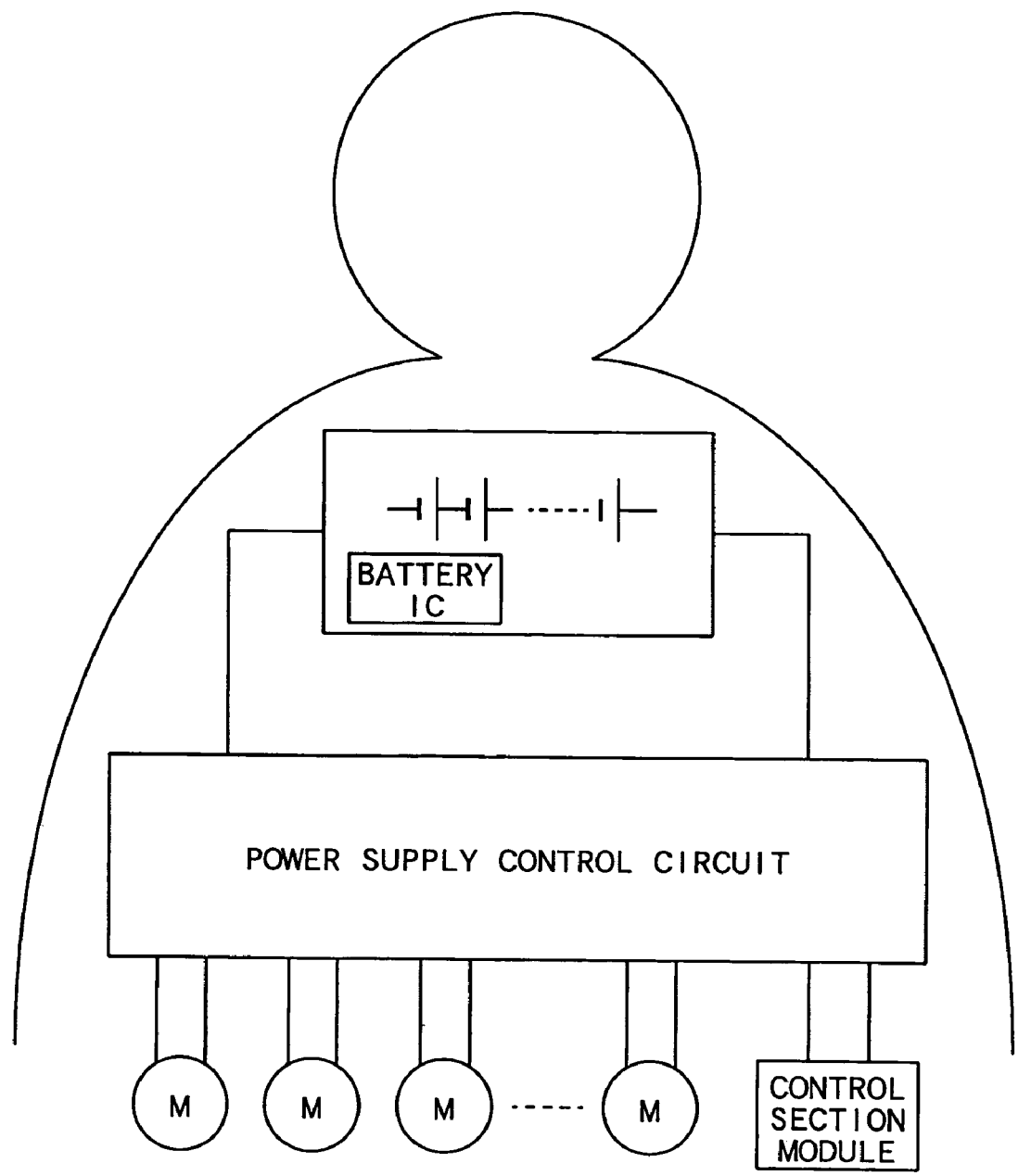
FIG. 33 is a schematic illustration of the power supply control system of the robot 1.

The robot 1 of this embodiment typically uses a rechargeable battery as drive power source. FIG. 33 is a schematic illustration of the power supply control system of the robot 1.

Referring to FIG. 33, a protection circuit (battery IC) is contained in the battery to control charging/discharging operations. The battery IC monitors the output of the drive power source and defines the conditions for detecting a serious power source abnormality and the most serious over-current state.

The power supply control circuit distributes the output of the drive power source for driving the robot 1 to the actuators/motors arranged in various parts of the body of the robot, the control modules (see FIG. 7) and the other electrically-driven modules of the robot 1. The power supply control circuit defines the conditions for judging a light over-current state and a heavy over-current state.

Figure 8:
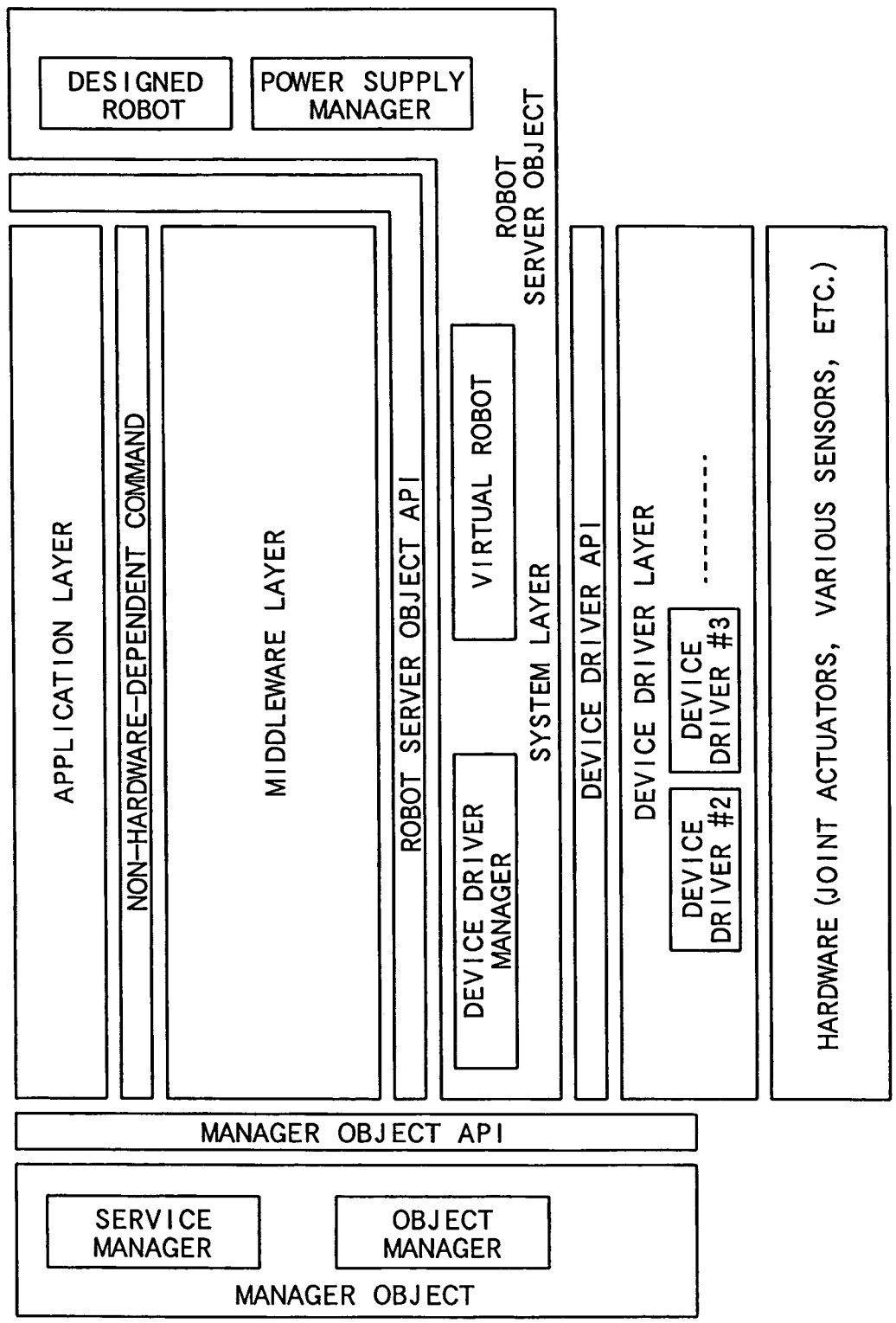
FIG. 8 is a schematic illustration of the configuration of the software control system that operates on the robot 1.

FIG. 8 is a schematic illustration of the configuration of the software control system that operates on the legged mobile robot 1 of this embodiment of the present invention.

Referring to FIG. 8, the software for controlling the robot has a hierarchical structure that is formed by software having a plurality of layers. The software for controlling the robot can adopt object-directed programming. Each piece of software is handled on the basis of module unit referred to "object" that is formed by integrally combining data and the processing procedures for the data.

The device drivers of the lowermost layer are objects that are authorized to directly access the hardware for driving the joint actuators and receiving the outputs of the sensors and adapted to perform processing operations in response to interrupt requests from the hardware.

The virtual robot is an object that operates as intermediary between the various device drivers and the objects that operate according to a predetermined inter-object communication protocol. Each hardware unit of the legged mobile robot 1 is accessed by way of the virtual robot.

The service manager is a system object that prompts interconnection of objects according to the inter-connection information described in the connection file.

The pieces of software on the system layer (OS) and the upper layers are modularized for each object (process) so that each object may be selected and replaced for each necessary function of the robot. Therefore, it is possible to freely connect the outputs/inputs of objects having data types that agree with each other by rewriting the connection file.

The software modules of the layers other than the device driver layer and system layer are roughly divided into those belonging to the middleware layer and those belonging to the application layer.

Figure 9:
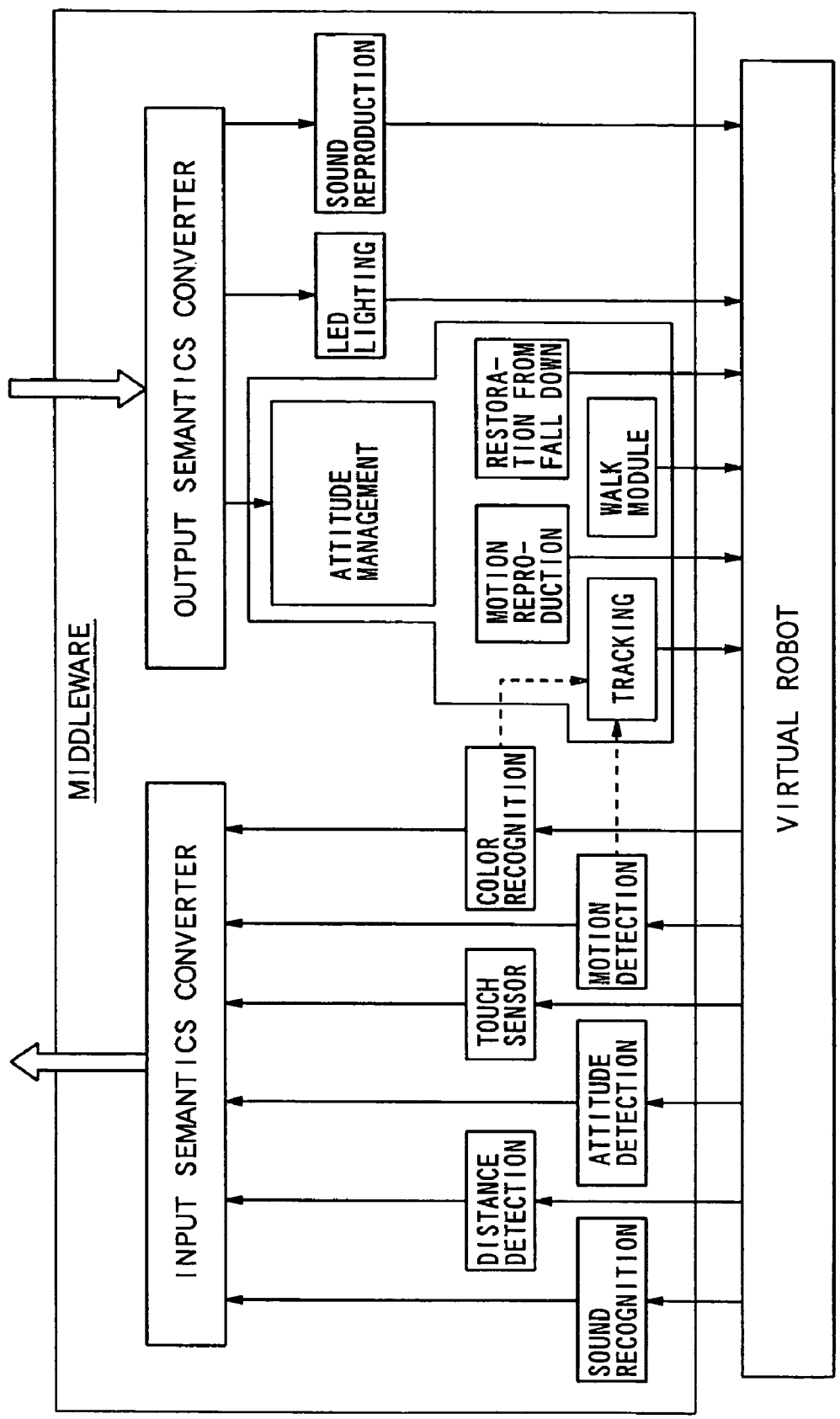
FIG. 9 is a schematic illustration of the internal configuration of the middleware layer of the robot 1.

FIG. 9 is a schematic illustration of the internal configuration of the middleware layer of the robot 1 that is drawn by paying attention to the behavior control feature of the robot 1. The middleware layer is a collection of software modules that provide various basic functions of the legged mobile robot 1 and the configuration of each module is apt to be influenced by the electric and mechanical characteristics of the legged mobile robot 1 and the attributes of the hardware such specifications and profiles. From the functional viewpoint, the middleware layer can be divided into a recognition system middleware part (the left half part in FIG. 9) and an output system middleware part (the right half part in FIG. 9).

The recognition system middleware part is adapted to receive the raw data fed from the hardware including the image data, the sound data and the detection data obtained from the sensors and process them. For example, it performs various processing operations including sound recognition, distance detection, attitude detection, contact detection, motion detection and color recognition according to various pieces of input information and obtains the result of recognition (e.g., "A ball is detected.", "A fall is detected.", "being stroked", "being hit", "The sounds of do, mi and so are heard.", "A moving object is detected.", "An obstacle is detected." "An obstacle is recognized." etc.). The application layer, which is the uppermost layer, is notified of the result of recognition by way of an input semantics converter, which result of recognition is utilized for subsequent action plans and learning sessions.

On the other hand, the output system middleware part is adapted to provide various functions including those of controlling a walk, replaying a motion, synthesizing an output sound and turning on LEDs that operate as eyes. In other words, the output system middleware part receives the action plan produced from the application layer by way of an output semantics converter, generates a servo command value for each joint of the legged mobile robot 1 and for each function of the legged mobile robot 1, output beams of light (LEDs) and output sounds and realizes a motion of the legged mobile robot 1 by way of virtual robot.

In the instance of FIG. 9, while the description of the configuration of the middleware layer is centered on the functions for controlling the behavior of the robot, the middleware layer also comprises functional modules for realizing basic hardware operations. For example, this embodiment comprises a load monitoring module section for detecting any overload state of the plurality of actuators/motors taken as a whole, a over-current monitoring module section for monitoring any occurrence of abnormality in the electric current relating to the drive power source and a module section for executing a machine body protecting operation in response to the detection of such an overload state or an abnormal state of the power source (as will be described in greater detail hereinafter).

Figure 10:
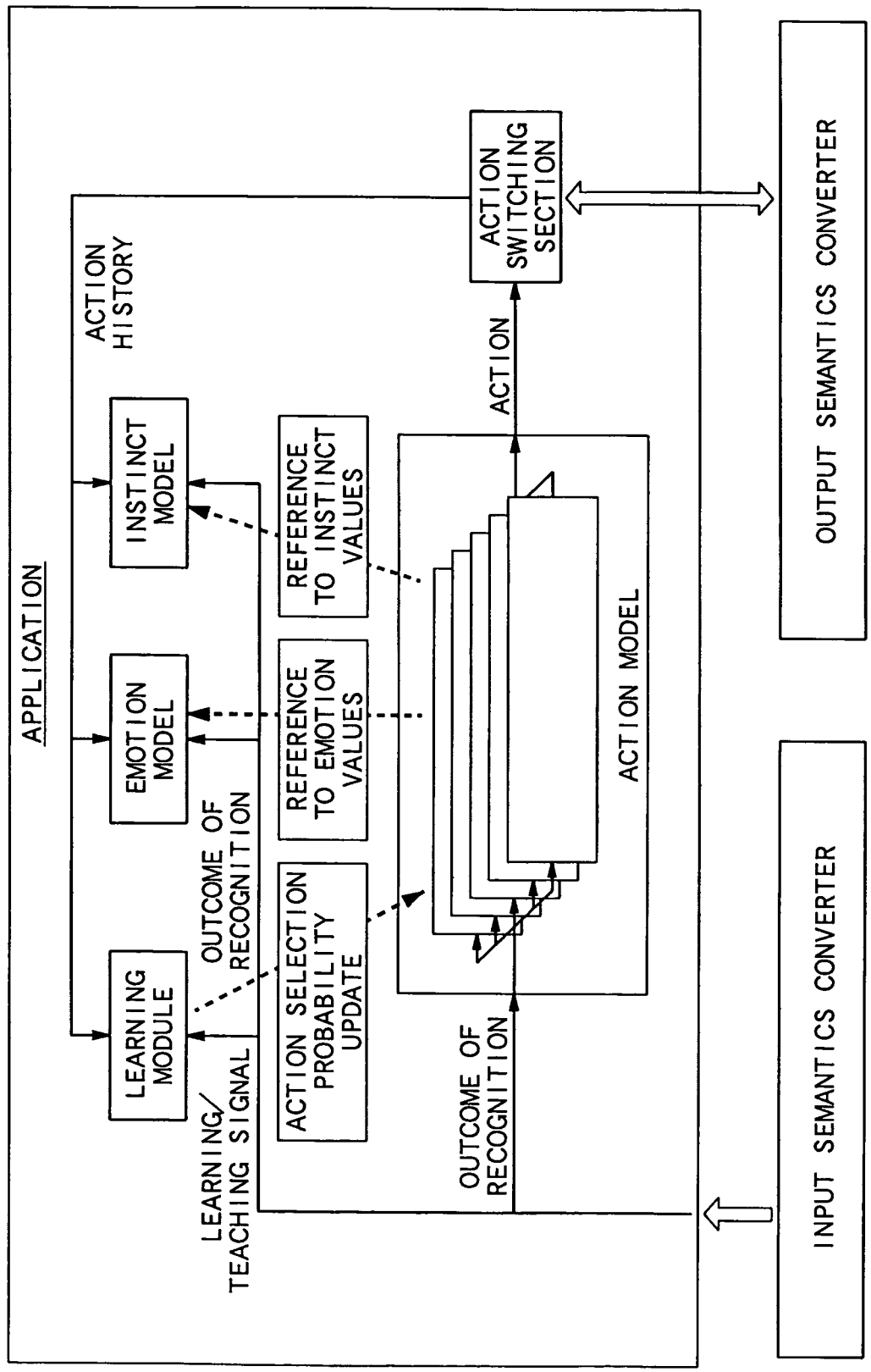
FIG. 10 is a schematic illustration of the internal configuration of the application layer of the robot 1.

FIG. 10 is a schematic illustration of the internal configuration of the application layer of the robot 1. The application layer is formed by one or more than one pieces of application software for controlling the operation of the legged mobile robot 1 and the internal state of the instincts, the emotions and so on of the robot 1.

The application software decides an action plan of the legged mobile robot 1, using the outcome of recognition received by way of the input semantics converter and sends back the decided action plan by way of the output semantics converter.

The application software is formed by emotion models obtained by modeling the emotions of the robot 1, instinct models obtained by modeling the instincts of the robot, learning modules for sequentially memorizing external events, action models obtained by modeling action patterns and an action switching section for switching the output destination of the actions decided by the action models.

The result of recognition that is input by way of the input semantics converter is input to the emotion models, the instinct models and the action models and also to the learning modules as learning/teaching signal.

The action as determined by means of the action models of the legged mobile robot 1 is transmitted to the middleware by way of the action switching section and the output semantics converter and carried out on the machine body of the legged mobile robot 1 or supplied to the emotion models, the instinct models and the learning modules as action history by way of the action switching section.

The emotion models and the instinct models receive the result of recognition and the action history as input and manage emotion values and instinct values. The action models can use the emotion values and the instinct values as references. The learning modules update the action selection probability on the basis of the learning/teaching signal and supply the updated contents to the action models.

B. Configuration of the Actuators $A_1$ Through $A_{24}$

As pointed out earlier, the degrees of freedom of the joints of the legged mobile robot 1 are realized by the actuators $A_1$ through $A_{24}$ of the robot 1.

Figure 11:
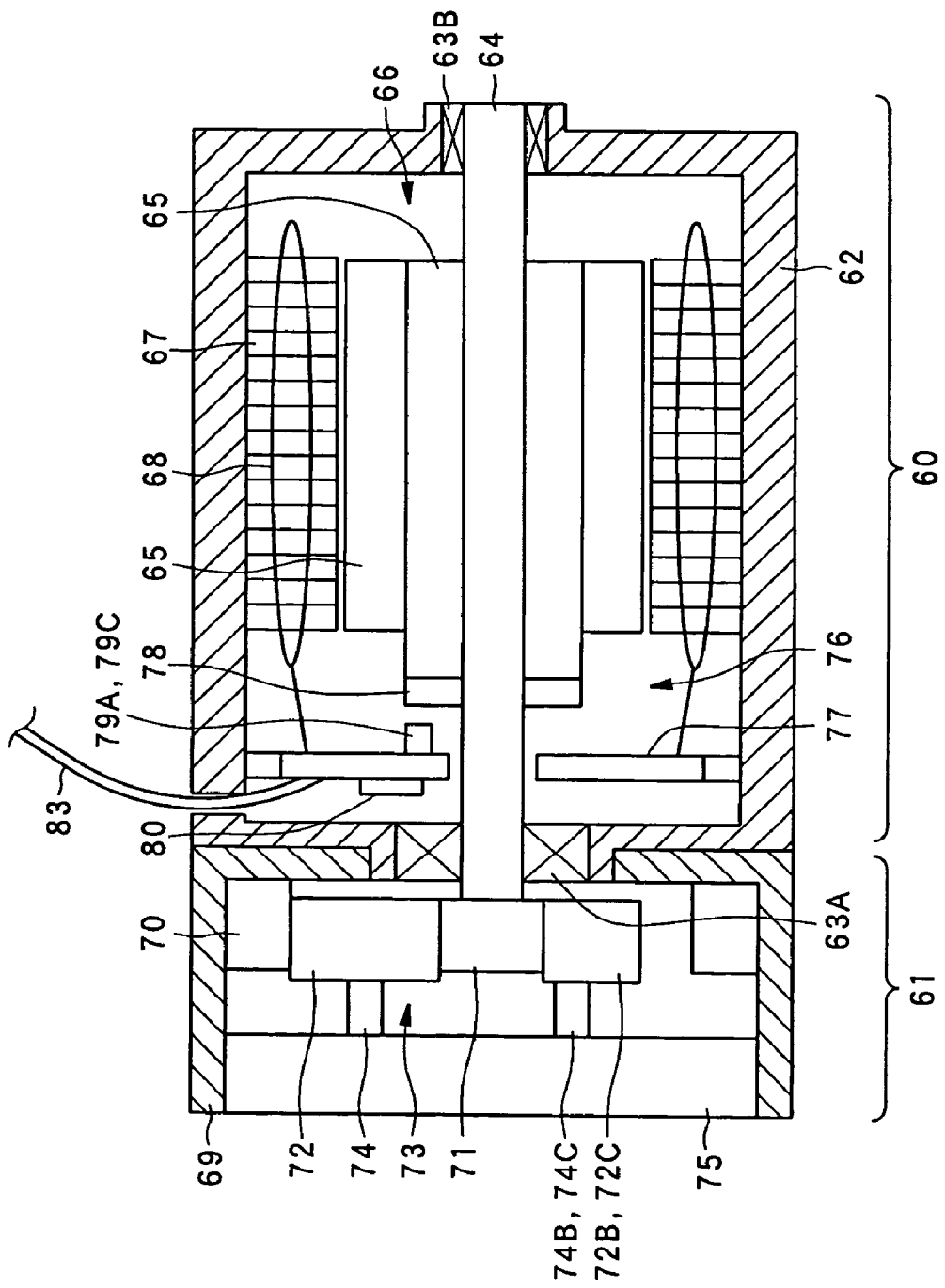
FIG. 11 is a schematic illustration of the internal configuration of actuators $A_1$ through $A_{24}$ of the robot 1.

FIG. 11 is a schematic illustration of the internal configuration of each of the actuators $A_1$ through $A_{24}$. As shown in FIG. 11, each of the actuators $A_1$ through $A_{24}$ comprises a motor section 60 for generating a rotary torque and a torque amplifyer section 61 for amplifying the rotary torque generated by the motor section 60 and output the amplified rotary torque.

Figure 12C:
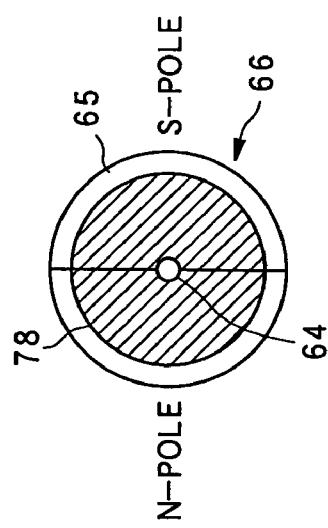
FIGS. 12A to 12C are schematic illustrations of the configuration of rotor shaft 64 and the magnetic pole angle sensor of the rotor shaft of the robot 1.
Figure 12B:
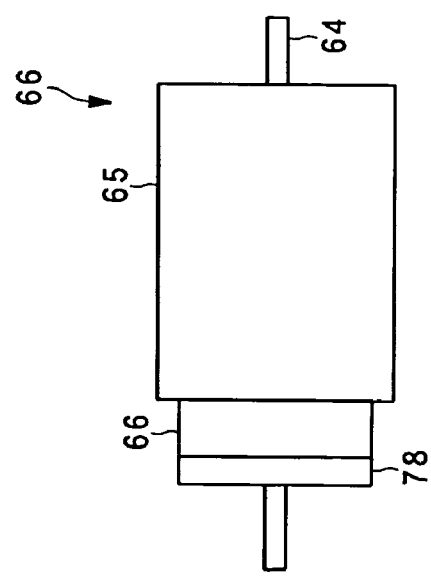
Figure 12A:
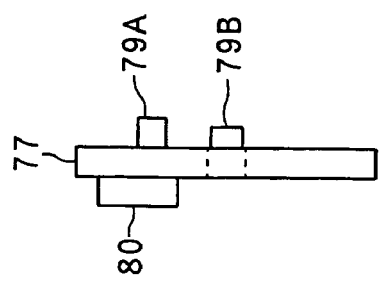

The motor section 60 has a rotor shaft 64 that is rotatably supported by rotary shaft bearings 63A, 63B arranged in a motor case 62 that is made of an electrically conductive material such as metal. FIGS. 12A to 12C are schematic illustrations of the configuration of the rotor shaft 64 and the magnetic pole angle sensor of the rotor shaft. As shown in FIGS. 12A to 12C, a rotor 66 is formed by integrally fitting a rotor magnet 65, which is a ring-shaped permanent magnet prepared by magnetizing a rotor base body 65 to a bipolar magnet, to the pole of the rotor shaft 64.

Figure 13:
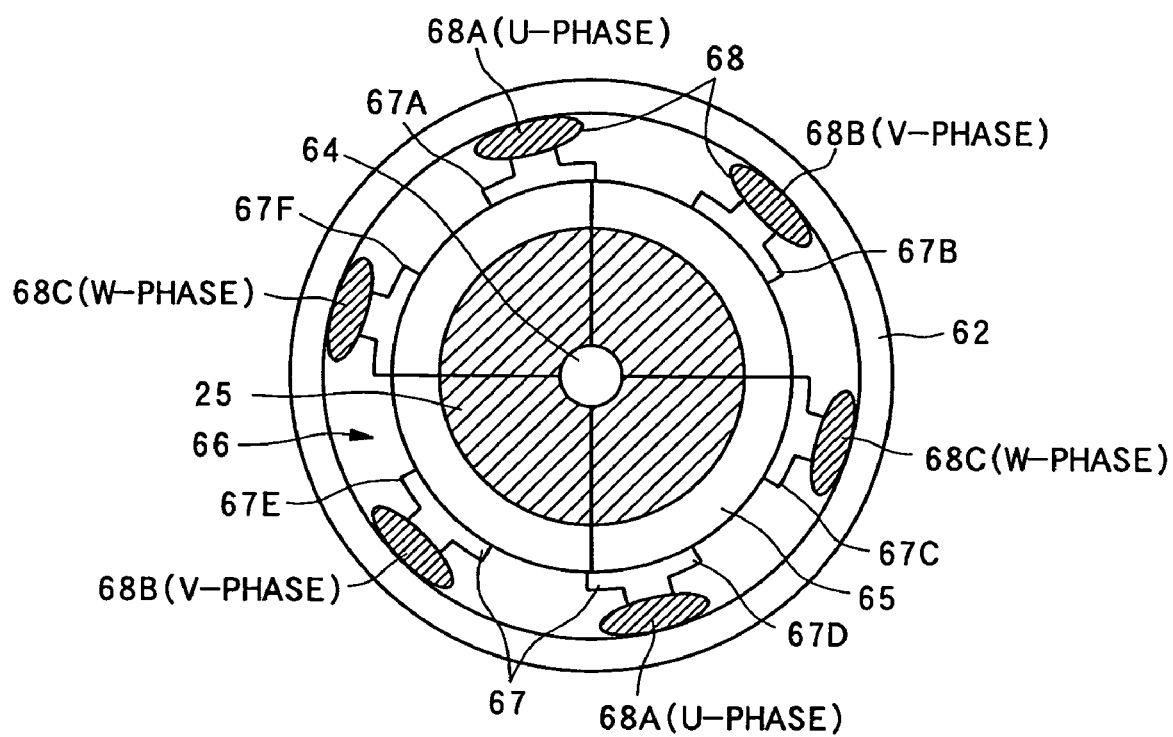
FIG. 13 is a schematic illustration of the positional relationship of rotor 66 and stator iron cores 67A through 67F.

FIG. 13 is a schematic illustration of the positional relationship of the rotor 66 and the stator iron cores 67A through 67F. As shown in FIG. 13, a total of six stator iron cores 67A through 67F are rigidly fitted to the inside of the motor case 62 at regular angular intervals (of 60°) so as to surround the rotor 66. A wire is wound around each of the stator iron cores 67 (67A through 67F) to form 3-phase coils 68 (68u, 68v, 68w).

As illustrated, the pairs of coils 68, which are arranged oppositely to produce three pairs, respectively show a u-phase, a v-phase and a w-phase. Coil currents whose phases are displaced by 120° are made to flow to the coils 68 of the u-phase, the v-phase and the w-phase so that they produce respective magnetic fields, the intensity of each of which is variable as a function of the current value of the drive current that is made to flow to the coil 68. With this arrangement, it is possible to make the rotor 66 generate a rotary torque as a function of the current values of the coil currents by way of the rotor 66.

FIGS. 14A to 14C are schematic illustrations of the configuration of torque amplifier section 61 of the robot 1. As seen from FIGS. 8 and 11, the torque amplifier section 61 has a gear case 69 that is rigidly and removably fitted to the front end of the motor case 62. An inner gear 70 rigidly secured to the inner surface of the gear case 69, a sun gear 71 rigidly fitted to the front end of the rotor shaft 64 and a planetary gear system 73 formed by three planet gears, or first through third planet gears 72A through 72C, that are disposed between the inner gear 70 and the sun gear 71 at regular angular intervals of 120° are arranged in the inside of the gear case 69.

The shafts 74A through 74C of the first through third planet gears 72A through 72C of the planetary gear system 73 are rigidly secured to output shaft 75 that is rotataby arranged at the front end of the gear case 69. With this arrangement, the torque amplifier section 61 can amplify the rotary torque applied to it from the motor section 60 by way of the rotor shaft 64 by means of the planetary gear system 73 and transmits the amplified rotary torque to the output shaft 75 so as to output it to the outside by way of the output shaft 75.

An encoder 76 for detecting the revolution of the rotor shaft 64 and a control substrate 77 for controlling the angle of revolution and the rotary torque of the output shaft 64 according to the operation command from an external host controller (or the corresponding sub-control sections 43A through 43D) are contained in the inside of the motor case 62 of the motor section 60 (see FIG. 11).

Figure 15A:
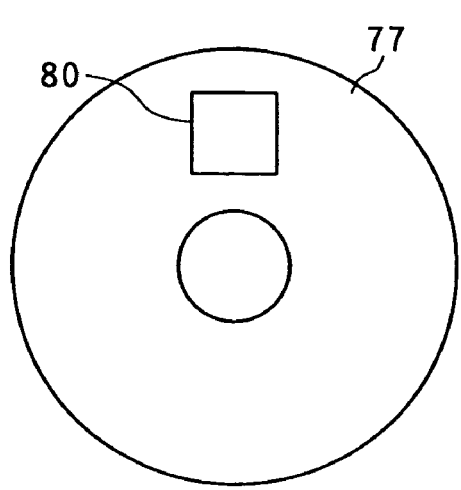
FIGS. 15A and 15B are schematic illustrations of the configuration of control substrate 77 of the robot 1.
Figure 15B:
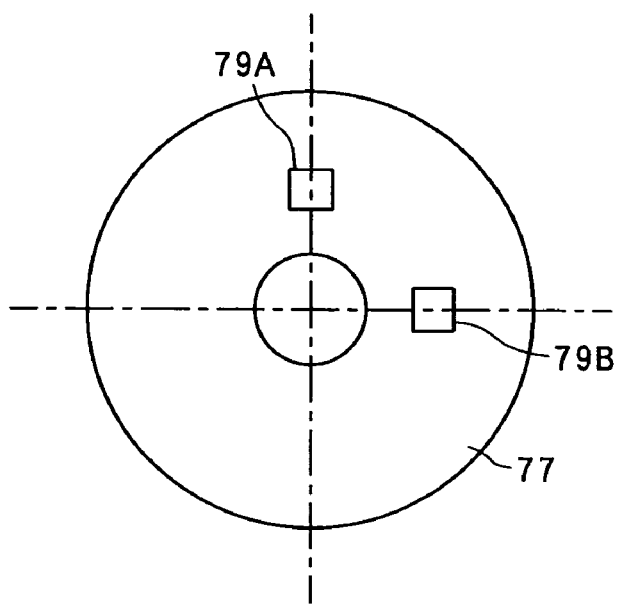

The encoder 76 is formed by a resin magnet 78 that is rigidly fitted to the front surface of the rotor base body 65 of the rotor 66 and magnetized to form a bipolar magnet and first and second Hall elements 79A, 79B (see FIG. 12C). FIGS. 15A and 15B are schematic illustrations of the configuration of the control substrate 77. As shown in FIG. 15B, the first and second Hall elements 79A, 79B are mounted on the control substrate 77 along a circle that is coaxial with the rotor shaft 64 at respective positions separated from each other by a phase difference of 90°.

Figure 16:
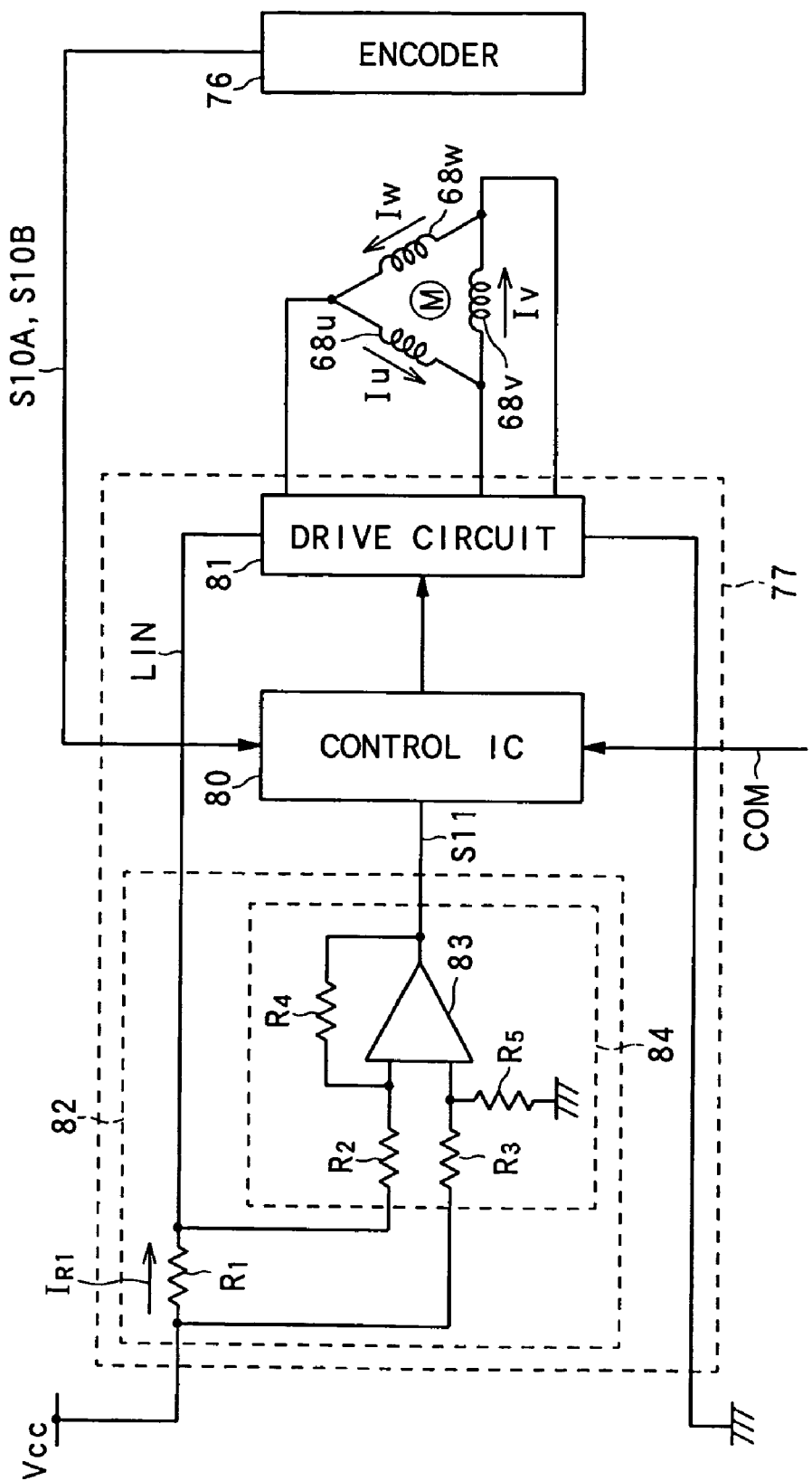
FIG. 16 is a schematic circuit diagram of the control substrate 77 of the robot 1.

The encoder 76 is formed by the resin magnet 78 that is rigidly fitted to the front surface of the rotor base body 65 of the rotor 66 and magnetized to form the bipolar magnet and the first and second Hall elements 79A and 79B (see FIG. 12C). FIGS. 15A, 15B and 16 are schematic illustrations of the configuration of the control substrate 77. As shown in FIG. 15B, the first and second Hall elements 79A and 79B are mounted on the control substrate 77 along a circle that is coaxial with the rotor shaft 64 at respective positions separated from each other by a phase difference of 90°. With this arrangement, the electric field of the resin magnet 78 of the encoder 76 that revolves integrally with the rotor shaft 64 changes so that the encoder 76 can detect the rotary position of the rotor shaft 64 by the change in the magnetic flux density of the positions where the first and second Hall elements 79A, 79B are arranged.

This embodiment additionally comprises a load monitoring module section for detecting the overload state, if any, of the plurality of actuators/motors as a whole and a module section for carrying out a machine body protecting operation in response to the detected overload state (which will be described in greater detail hereinafter).

As shown in FIG. 16, the control substrate 77 comprises a control IC 80 that mounted on one of the opposite sides of an annular printed circuit board of the control substrate 77 and a drive circuit 81 for supplying drive currents $I_u$, $I_v$ and $I_w$ respectively to the coils 68u, 68v and 68w, of the motor section 60 under the control of the control IC 80. The control IC 80 receives the outputs of the first and second Hall elements 79A, 79B as inputs of first and second position detection signals S10A, S10B and detects the rotary position of the rotor shaft 68 according to the input values.

The control substrate 77 is connected to the host controller (or the corresponding sub-control sections) by way of cable 83 (see FIG. 11) so that the control IC 80 communicates with the host controller and receives the supply voltage $V_{cc}$ as input by way of the cable 83.

Thus, according to the operation command COM given to it from the host controller by way of the cable 83 and the first and second position detection signals S10A, S10B, the control IC 80 applies the drive currents $I_u$, $I_v$ and $I_w$ of the corresponding current values respectively to the coils 68u, 68v and 68w, of the u-phase, the v-phase and the w-phase of the motor section 60. With this arrangement, it is possible to drive the motor 60 to revolve and show a rotary angle or a rotary torque that corresponds to the operation command COM from the host controller.

C. Detailed Configuration of the Control IC 80 and the Drive Circuit 81

Figure 17:
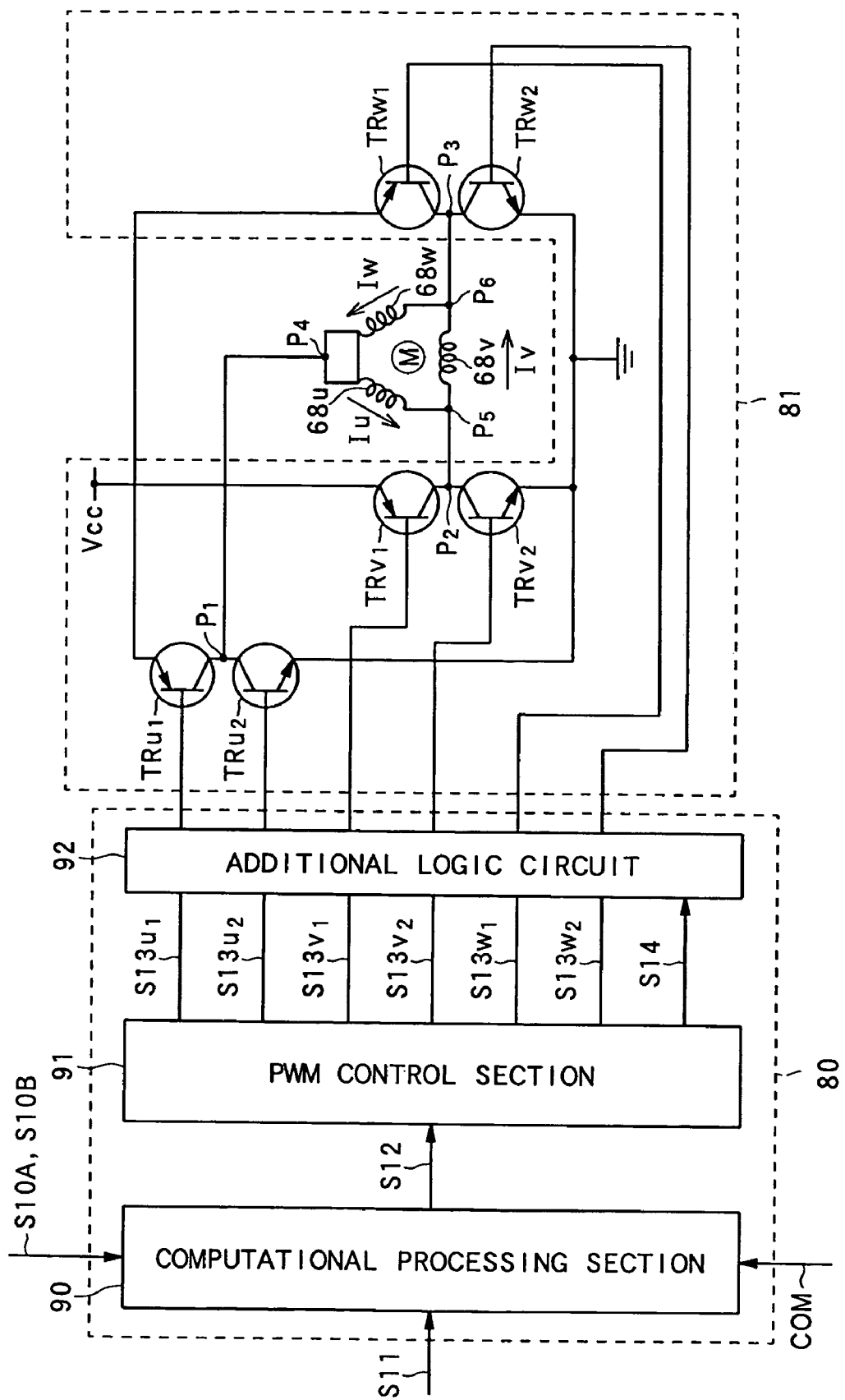
FIG. 17 is a schematic circuit diagram of control IC 80 and drive circuit 81.

FIG. 17 is a schematic circuit diagram of control IC 80 and drive circuit 81. As shown in FIG. 17, the control IC 80 comprises a processing section 90, a PWM control section 91 and an additional logic circuit 92.

The processing section 90 is a micro-computer comprising a CPU, a ROM and a RAM among others and adapted to compute the difference between the target rotary position of the rotor shaft 64 of the motor section 60 according to the operation command COM from the host controller and the current rotary position of the rotor shaft 64 that is computationally determined on the basis of the first and second position detection signals S10A, S10B given to it from the encoder 76 and the target output torque (to be referred to as target torque hereinafter) necessary for reducing the difference to nil and transmits the outcome of the computations to the PWM control section 91 as torque command signal S12.

The PWM control section 91 operates for PWM control of controlling the drive circuit 81 by way of the additional logic circuit 92 so that the output torque of the motor section 60 may agree with the target torque according to the torque command signal S12 supplied to it.

The drive circuit 81 comprises a pair of transistors for the u-phase including a PNP-type transistor $TR_{u1}$ and an NPN-type transistor $TR_{u2}$, a pair of transistors for the v-phase including a PNP-type transistor $TR_{v1}$ and an NPN-type transistor $TR_{v2}$ and a pair of transistors for the w-phase including a PNP-type transistor $TR_{w1}$ and an NPN-type transistor $TR_{w2}$.

The emitter of each of the PNP-type transistors $TR_{u1}$, $TR_{v1}$ and $TR_{w1}$ is connected to the supply voltage $V_{cc}$ and the collector of each of them is connected to the collector of the corresponding one of the pairing NPN transistors $TR_{u2}$, $TR_{v2}$ and $TR_{w2}$. The emitter of each of the NPN transistors $TR_{u2}$, $TR_{v2}$ and $TR_{w2}$ is grounded. The connection middle points P1 through P3 between the collectors of the PNP-type transistors $TR_{u1}$, $TR_{v1}$ and $TR_{w1}$ and those of the pairing NPN transistors $TR_{u2}$, $TR_{v2}$ and $TR_{w2}$ are connected respectively to the connection middle point P4 between the coil 68u for the u-phase and the coil 68w for the w-phase, the connection middle point P5 between the coil 68u for the u-phase and the coil 68v for the v-phase and the connection middle point P6 between the coil 68v for the v-phase and the coil 68w for the w-phase.

With the drive circuit 81 having the above described configuration, it is possible to hold the coil 68u for the u-phase in an energized state and make the drive current $I_u$ flow in the direction as indicated by corresponding arrows by turning on the PNP-type transistor $TR_{u1}$ for the u-phase and the NPN-type transistor $TR_{v2}$ for the v-phase and turning off the NPN-type transistor $TR_{u2}$ for the u-phase and the PNP-type transistor $TR_{v1}$ for the v-phase. Additionally, it is possible to bring the terminals P4, P5 into an open state and hold the coil 68u for the u-phase in an unenergized state by turning off the PNP-type transistor $TR_{u2}$ for the u-phase and the PNP-type transistor $TR_{v1}$ for the v-phase and also turning off the NPN-type transistor $TR_{u2}$ for the u-phase and the NPN-type transistor $TR_{v2}$ for the v-phase.

Similarly, with the drive circuit 81, it is possible to hold the coil 68v for the v-phase in an energized state and make the drive current $I_v$ flow in the direction as indicated by corresponding arrows by turning on the PNP-type transistor $TR_{v1}$ for the v-phase and the NPN-type transistor $TR_{w2}$ for the w-phase and turning off the NPN-type transistor $TR_{v2}$ for the v-phase and the PNP-type transistor $TR_{w1}$ for the w-phase. Additionally, it is possible to bring the terminals P5, P6 into an open state and hold the coil 68v for the v-phase in an unenergized state by turning off the PNP-type transistor $TR_{v1}$ for the v-phase and the PNP-type transistor $TR_{w1}$ for the w-phase and also turning off the NPN-type transistor $TR_{v2}$ for the v-phase and the NPN-type transistor $TR_{w2}$ for the w-phase.

Likewise, with the drive circuit 81, it is possible to hold the coil 68w for the w-phase in an energized state and make the drive current $I_w$ flow in the direction as indicated by corresponding arrows by turning on the PNP-type transistor $TR_{w1}$ for the w-phase and the NPN-type transistor $TR_{u2}$ for the u-phase and turning off the NPN-type transistor $TR_{w2}$ for the w-phase and the PNP-type transistor $TR_{u1}$ for the u-phase. Additionally, it is possible to bring the terminals P6, P4 into an open state and hold the coil 68w for the w-phase in an unenergized state by turning off the PNP-type transistor $TR_{w1}$ for the w-phase and the PNP-type transistor $TR_{u1}$ for the u-phase and also turning off the NPN-type transistor $TR_{w2}$ for the w-phase and the NPN-type transistor $TR_{u2}$ for the u-phase.

In this way, the PWM control section 91 can sequentially switch the coils 68u, 68v, 68w respectively for the u-phase, the v-phase, the w-phase from an energized state to an unenergized state and vice versa and drive the motor section 60 to revolve by applying first through sixth PWM signals $S13_{u1}$, $S13_{u2}$, $S13_{v1}$, $S13_{v2}$, $S13_{w1}$, $S13_{w2}$, which vary as a function of the target torque that is obtained according to the torque command signal S12, to the bases of the PNP-type transistor $TR_{u1}$ for the u-phase, the PNP-type transistor $TR_{v1}$ for the v-phase, the PNP-type transistor $TR_{w1}$ for the w-phase, the NPN-type transistor $TR_{u2}$ for the u-phase, the NPN-type transistor $TR_{v2}$ for the v-phase and the NPN-type transistor $TR_{w2}$ for the w-phase at predetermined timings.

When controlling the rotary position of the motor section 60 by PWM control, there can arise a problem of torque loss as the electric current (the electric charge to be more accurate) supplied to the motor section 60 flows out and/or a problem that the motor section 60 is apt to be influenced by the uneven torque that is produced by cogging as the terminals P4, P5, P6 of the coils 68u, 68v, 68w are brought into an open state while the coils 68u, 68v, 68w are unenergized.

Figure 18:
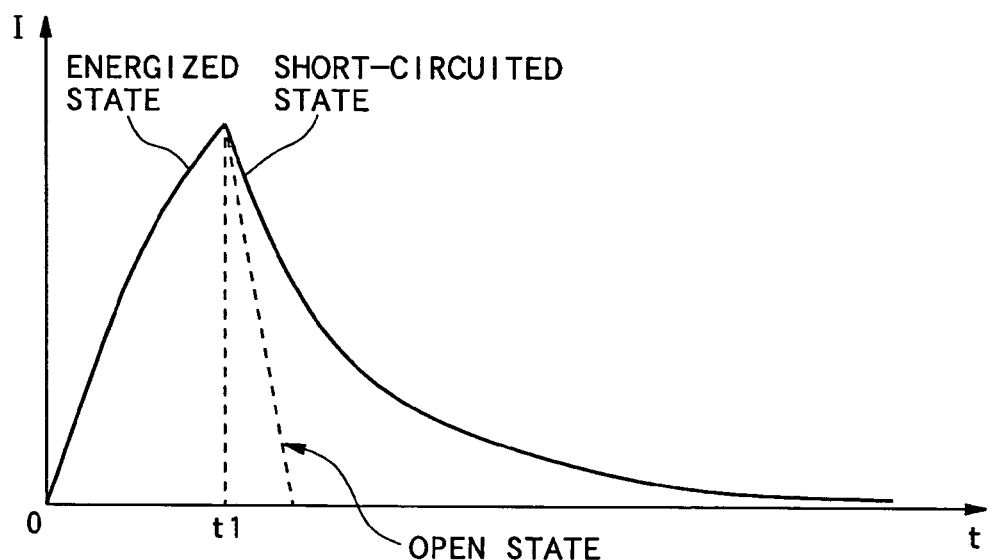
FIG. 18 is a graph illustrating the transient response characteristic of the coil current when the terminals of the coils are brought into an open state and into a short-circuited state.

In this embodiment, the torque loss problem is dissolved by utilizing the property that the electric current (the electric charge to be more accurate) supplied to the coils 68u, 68v, 68w hardly flows out if the terminals P4, P5, P6 of the coils 68u, 68v, 68w are brought not into an open state but into a short-circuited state while the coils 68u, 68v, 68w are unenergized. FIG. 18 is a graph illustrating the transient response characteristic of the coil current when the terminals of the coils are brought into an open state and into a short-circuited state. It will be appreciated that the setting time of the transient characteristic is prolonged when the terminals of the coils are brought into a short-circuited state than when they are brought into an open state so that the coil current can hardly flows out.

This arrangement utilizes the time delay of the transient response that is attributable to the DC resistances and the inductances of the coils 68u, 68v, 68w of the motor section 60 when the terminals P4, P5, P6 of the coils 68u, 68v, 68w are brought into a short-circuited state. A counter electromotive force is generated in the coils 68u, 68v, 68w of the motor section 60 by the short-circuited state due to the magnetic flux density from the rotor magnet 65. A force in the sense opposite to the sense of revolution of the rotor 66 is produced by the counter electromotive force to give rise to a viscous resistance relative to the revolution by external force, which by turn produces an effect like that of a brake. Thus, it is possible to eliminate the torque loss by the viscous resistance that can produce a coefficient of viscosity for the motor section 60 and reduce the influence of the uneven torque due to cogging.

Note, however, when the terminals P4, P5, P6 of the coils 68u, 68v, 68w are brought into a short-circuited state, a sort of viscous resistance is applied to the motor section 60 as described above so that there arises a problem that the motor section 60 may lose compliance (mechanical passivity) under the influence of the brake that is produced by the short-circuited state of the terminals P4, P5, P6 of the coils 68u, 68v, 68w.

Therefore, in this embodiment, the terminals P4, P5, P6 of the coils 68u, 68v, 68w are sequentially switched from an open state to a short-circuited state and vice versa and the ratio of the period of open state to the period of short-circuited state is regulated to give rise to a desired degree of compliance while the coils 68u, 68v, 68w are unenergized in order to dissolve both the problem of torque loss caused by an open state of the terminals P4, P5, P6 of the coils 68u, 68v, 68w and the problem of a reduced level of compliance caused by a short-circuited state of the terminals P4, P5, P6 of the coils 68u, 68v, 68w.

Figure 19:
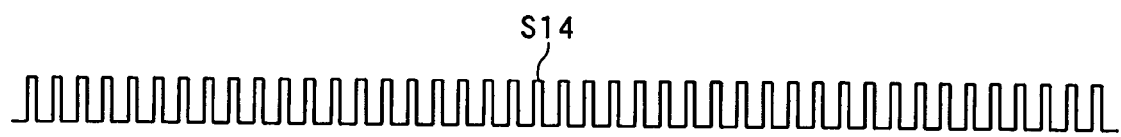
FIG. 19 is a schematic illustration of an exemplar waveform of BRAKE_PWM control signal.

In reality, an additional logic circuit 92 is arranged downstream relative to the PWM control section 91 as a means for sequentially switching the terminals P4, P5, P6 of the coils 68u, 68v, 68w from an open state to a short-circuited state and vice versa. A BRAKE_PWM control signal S14 having a rectangular waveform and PWM-modulated as a function of the predefined ratio of the period of open state to the period of short-circuited state of the terminals P4, P5, P6 of the coils 68u, 68v, 68w is applied to the additional logic circuit 92 along with the first through sixth PWM signals $S13_{u1}$, $S13_{u2}$, $S13_{v1}$, $S13_{v2}$, $S13_{w1}$, $S13_{w2}$ from the PWM control section 91. FIG. 19 is a schematic illustration of an exemplar waveform of BRAKE_PWM control signal.

For the purpose of short-circuiting the terminals P4, P5, P6 of the coils 68u, 68v, 68w during the period when the coils 68u, 68v, 68w are unenergized and the BRAKE_PWM signal S14 is at logic "1" level, the additional logic circuit 92 is so adapted to switch the logic levels of the corresponding first through sixth PWM signals $S13_{u1}$, $S13_{u2}$, $S13_{v1}$, $S13_{v2}$, $S13_{w1}$, $S13_{w2}$ whenever necessary.

More specifically, when the coils are in an ordinary unenergized state, the PWM control section 91 outputs the first through fourth PWM signals $S13_{u1}$, $S13_{u2}$, $S13_{v1}$, $S13_{v2}$ for turning off the PNP-type transistor $TR_{u1}$ for the u-phase and the PNP-type transistor $TR_{v1}$ for the v-phase and also turning off the NPN-type transistor $TR_{u2}$ for the u-phase and the NPN-type transistor $TR_{v2}$ for the v-phase. On the other hand, during the period when the BRAKE_PWM control signal S14 is at logic "1" level, the additional logic circuit 92 turns on the PNP-type transistor $TR_{u1}$ for the u-phase and the PNP-type transistor $TR_{v1}$ for the v-phase from the off state so as to intermittently produce a short-circuited state for the terminals P4 and P5 of the coil 68u for the u-phase.

Similarly, when the coils are in an ordinary unenergized state, the PWM control section 91 outputs the third through sixth PWM signals $S13_{v1}$, $S13_{v2}$, $S13_{w1}$, $S13_{w2}$ for turning off the PNP-type transistor $TR_{v1}$ for the v-phase and the PNP-type transistor $TR_{w1}$ for the w-phase and also turning off the NPN-type transistor $TR_{v2}$ for the v-phase and the NPN-type transistor $TR_{w2}$ for the w-phase. On the other hand, during the period when the BRAKE_PWM control signal S14 is at logic "1" level, the additional logic circuit 92 turns on the PNP-type transistor $TR_{v1}$ for the v-phase and the PNP-type transistor $TR_{w1}$ for the w-phase from the off state so as to intermittently produce a short-circuited state for the terminals P5 and P6 of the coil 68v for the v-phase.

Likewise, when the coils are in an ordinary unenergized state, the PWM control section 91 outputs the first, second, fifth and sixth PWM signals $S13_{u1}$, $S13_{u2}$, $S13_{w1}$, $S13_{w2}$ for turning off the PNP-type transistor $TR_{w1}$ for the w-phase and the PNP-type transistor $TR_{u1}$ for the u-phase and also turning off the NPN-type transistor $TR_{w2}$ for the w-phase and the NPN-type transistor $TR_{u2}$ for the u-phase. On the other hand, during the period when the BRAKE_PWM control signal S14 is at logic "1" level, the additional logic circuit 92 turns on the PNP-type transistor $TR_{w1}$ for the w-phase and the PNP-type transistor $TR_{u1}$ for the u-phase from the off state so as to intermittently produce a short-circuited state for the terminals P6 and P4 of the coil 68w for the w-phase.

Meanwhile, when the coils are in an ordinary unenergized state, the additional logic circuit 92 outputs the first through sixth PWM signals $S13_{u1}$, $S13_{u2}$, $S13_{v1}$, $S13_{v2}$, $S13_{w1}$, $S13_{w2}$ from the PWM control section 91 without switch them so long as the BRAKE_PWM control signal S14 is at logic "0" level. Therefore, so long as the BRAKE_PWM control signal S14 is at logic "0" level, the terminals P4, P5, P6 of the coils 68u, 68v and 68w respectively for the u-phase, the v-phase and the w-phase are held to an open state.

Figure 20:
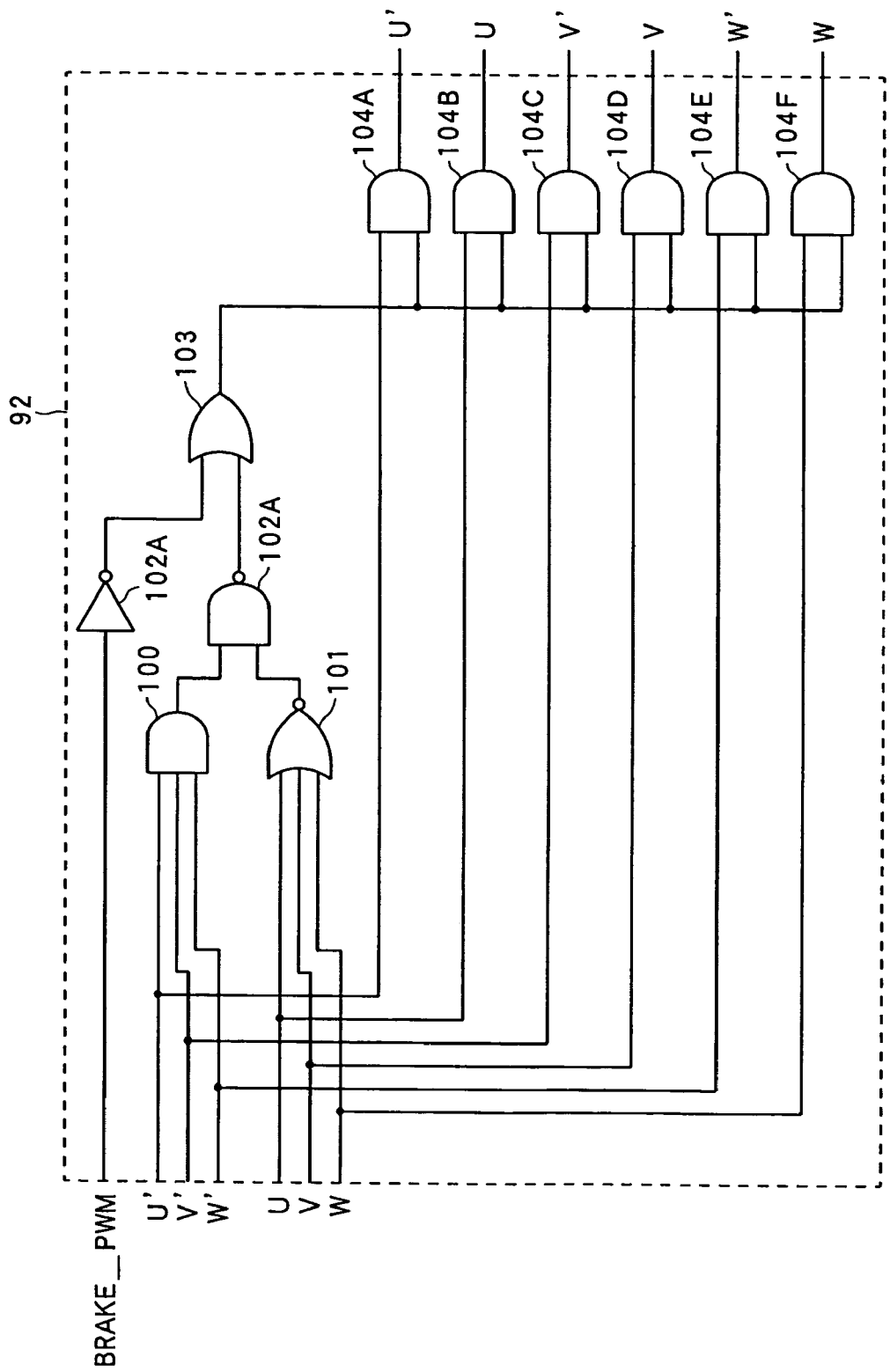
FIG. 20 is a circuit diagram of additional logic circuit 92, illustrating a specific configuration thereof.

FIG. 20 is a circuit diagram of the additional logic circuit 92, illustrating a specific configuration thereof. In the instance of the illustrated additional logic circuit 92, the AND of the first PWM signal $S13_{u1}$, the third PWM signal $S13_{v1}$ and the fifth PWM signal $S13_{w1}$ from the PWM control section 91 is computed by AND circuit 100, while the XOR of the second PWM signal $S13_{u2}$, the fourth PWM signal $S13_{v2}$ and the sixth PWM signal $S13_{w2}$ is computed by NOR circuit 101.

The NAND of the output of the AND circuit 100 and that of the NOR circuit 101 is computed by NAND circuit 102B and the OR of the output of the NAND circuit 102B and the output of circuit 102A that is the inverted signal of the BRAKE_PWM control signal S14 is computed by OR circuit 103.

Furthermore, the ANDs of the output of the OR circuit 103 and the original first through sixth PWM signals $S13_{u1}$, $S13_{u2}$, $S13_{v1}$, $S13_{v2}$, $S13_{w1}$ and $S13_{w2}$ are computed respectively by first through sixth AND circuits 104A through 104F. Then, the outputs of the first through sixth AND circuits 104A through 104F are applied respectively to the PNP-type transistor $TR_{u1}$ and the NPN-type transistor $TR_{u2}$ for the u-phase, the PNP-type transistor $TR_{v1}$ and the NPN-type transistor $TR_{v2}$ for the v-phase and the PNP-type transistor $TR_{w1}$ and the NPN-type transistor $TR_{w2}$ for the w-phase as described above.

When the terminals P4, P5, P6 of the coils 68u, 68v, 68w are brought into a short-circuited state while the coils are unenergized, it takes a long time before the drive currents $I_u$, $I_v$ and $I_w$ of the coils 68u, 68v and 68w get back to nil due to the transient response as described above by referring to FIG. 18. Therefore, when an open state is switched to a short-circuited state and vice versa repeatedly while the coils 68u, 68v and 68w are unenergized, the next energizing session starts before the drive currents $I_u$, $I_v$ and $I_w$ get back to nil.

Thus, with this arrangement, the maximum values of the drive currents $I_u$, $I_v$ and $I_w$ that are supplied to the coils 68u, 68v and 68w gradually rise each time the coils 68u, 68v and 68w are energized and then unenergized at a rate substantially proportional to the duty ratio, or the ratio of the BRAKE_PWM control signal S14 brought to logic level "1". Similarly, the effective values of the drive currents $I_u$, $I_v$ and $I_w$ of the coils 68u, 68v and 68w gradually rise at a rate proportional to the duty ratio, or the ratio of the BRAKE_PWM control signal S14 brought to logic level "1".

Additionally, the output torque of the motor section 60 is equal to the sum of the drive currents $I_u$, $I_v$ and $I_w$ that are supplied to the coils 68u, 68v and 68w multiplied by the torque constant $K_t$ of the motor section 60. Thus, when the coils 68u, 68v and 68w are energized and unenergized repeatedly, the effective value of the output torque of the motor section 60 increases as the sum of the drive currents $I_u$, $I_v$ and $I_w$ increases.

The rate at which the effective value rises is substantially proportional to the duty ratio of the BRAKE_PWM control signal S14, or the ratio of the BRAKE_PWM control signal S14 brought to logic level "1". The rate at which the output torque of the motor section 60 rises is proportional to the coefficient of viscosity of the motor section 60. In other words, it is possible to dynamically and arbitrarily define the coefficient of viscosity of the motor section 60 within the range of duty resolution by means of the duty ratio of the BRAKE_PWM control signal S14.

Therefore, it is possible to control the coefficient of viscosity of the motor section 60 by changing the duty ratio of the BRAKE_PWM control signal S14. It is also possible to control the electric currents (the quantities of the electric charges) flowing to the coils 68u, 68v and 68w when the coils 68u, 68v and 68w respectively for the u-phase, the v-phase and the w-phase are unenergized.

If the duty ratio of the BRAKE_PWM control signal S14 is selected so as to raise the coefficient of viscosity, the holding effect of the motor section 60 is improved to reduce the external disturbances to the torque such as cogging. Then, it is also possible to control the extent of compliance relative to external force.

Figure 21:
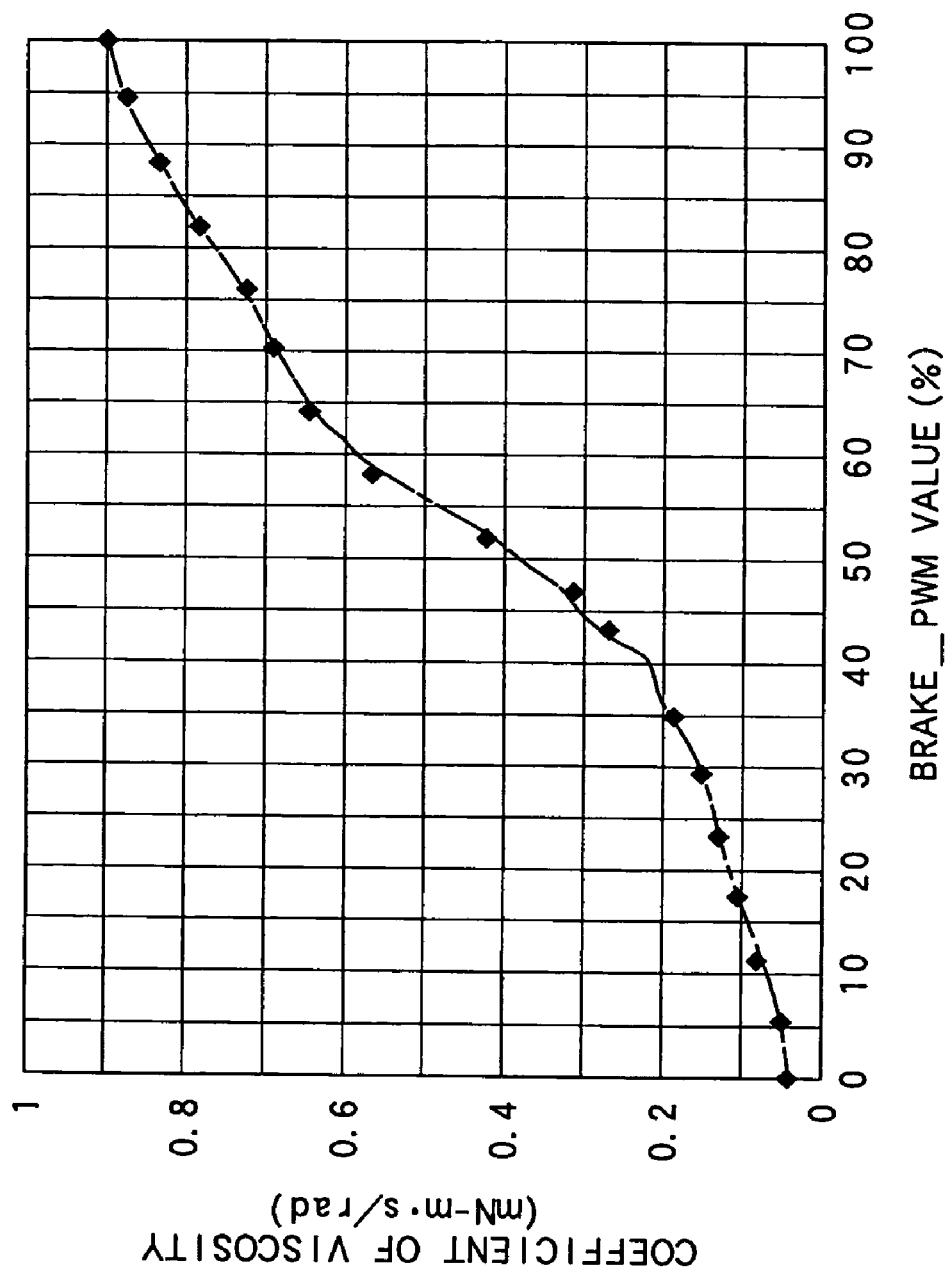
FIG. 21 is a graph illustrating the relationship between the duty ratio of BRAKE_PWM control signal and the coefficient of viscosity of motor section 60.

In this way, it is possible to obtain a desired level of compliance by regulating the ratio of the open state to the short-circuited state of the terminals P4, P5, P6 of the coils 68u, 68v, 68w when the coils are unenergized by PWM-controlling the duty ratio of the BRAKE_PWM control signal S14 that the PWM control section 91 supplies to the additional logic circuit 92. FIG. 21 is a graph illustrating the relationship between the duty ratio of the BRAKE_PWM control signal S14 and the coefficient of viscosity of the motor section 60.

D. Load Absorption Mechanism of the Actuators $A_1$ Through $A_{24}$

A sophisticated legged mobile robot can typically autonomously walk and perform various operations by using the legs. Additionally, such a robot can stand up from a posture of lying on the face or on the back. It can also hold an object by hand and carry it to some other place. On the other hand, when such a robot falls on the floor or collides with an object on the floor on the intended route of movement, some or all of the joint actuators of the robot may be subjected to a tremendously excessive load. The machine can be broken, plastically deformed or otherwise fatally damaged by such an excessive load. Therefore, it is important for the motors of the joint actuators of a robot to incorporate a mechanism for absorbing such a load.

In this section, the load absorption mechanism that the actuators $A_1$ through $A_{24}$, which are used for driving the joints of the robot 1, are provided with will be described.

Figure 22:
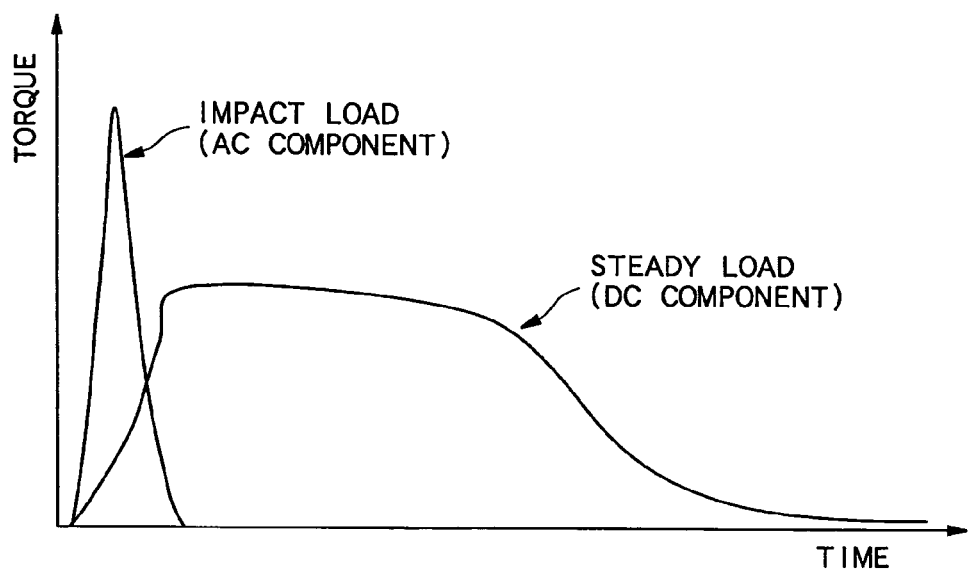
FIG. 22 is a schematic illustration of the AC component and the DC component of a load torque that can be applied to one of the actuators of the robot 1.

The inventors of the present invention roughly classifies the load torques that are applied to the motors of the joint actuators into a category of so-called "impact load" that applies straining energy to one or more than one members such as links until they may be destructed when the robot 1 is subjected to an impulsive impact and a category of so-called "steady load" that is relatively heavy and continues for more than a predetermined period of time (or steadily) so as to eventually give rise to a plastic deformation to the members to which the load is applied (see FIG. 22). The value of the steady load torque provides a threshold value that is found near the stalling torque of the motors being used or the limit for protecting the circuits of the robot. The inventors of the present invention define the impact load as AC component of the load torque and the steady load as DC component of the load torque.

The steady load, or the DC component of the load torque, can be detected on the basis of the sum of the absolute value of the load torque stationarily applied to the link coupled to the output shaft of the actuator/motor and that of the torque generated by the actuator/motor itself. When the sum of the torques exceeds the threshold value for giving rise to a plastic deformation for over a predetermined period of time, it is possible to recognize that the DC component of the load is excessive in response to the situation. The torque generated by a motor is proportional to the motor current and hence the torques can be observed by subjecting the motor current to a current-voltage conversion.

Figure 23:
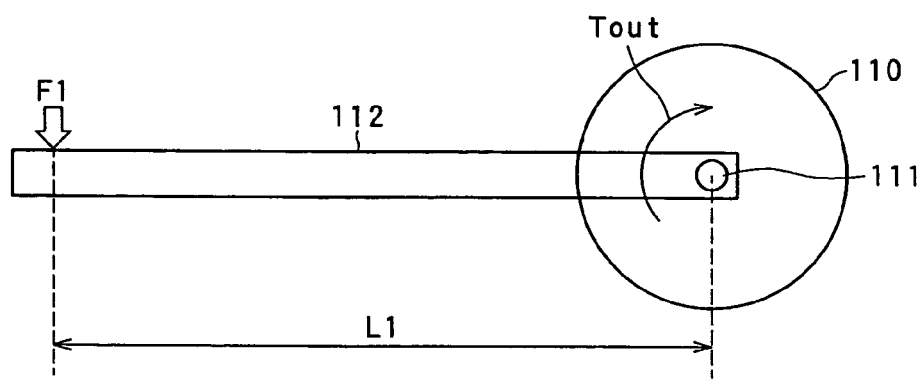
FIG. 23 is a schematic illustration of the mechanism of load absorption according to the invention.

For example, referring to FIG. 23, assume here an occasion where a link 112 having an end coupled to the output shaft 111 of an actuator 110 is caught immobile at the other end (located at position separated from the output shaft 111 by distance L1) as the latter abuts a wall or some other object and becomes subjected to external force F1 that is applied by the wall or some other object so that the actuator 110 generates an additional torque that corresponds to the increased load.

Then, if the generated torque that is firstly generated by the actuator 110 is $T_{ORG}$ and the load torque at which the actuator 110 becomes broken when it is applied to the output shaft 111 of the actuator 110 is $T_{BRK}$, the condition that the actuator 110 needs to meet in order to prevent itself from being broken is that the sum $T_{out}$ of the absolute value of the load torque that is newly added by the external force F1 and that of the generated torque $T_{ORG}$ of the actuator 110 does not exceed $T_{BRK}$ for more than a predetermined period of time.

[Formula 1]

$$F1 \times L1 + T_{OUT} \leq T_{BRK} \quad (1)$$

The load torque $T_{out}$ corresponds to the DC component of the load and will be referred to "static load torque" hereinafter. From the formula (1) above, the actuator 110 can be prevented from being broken by so controlling in advance the generated torque $T_{out}$ of the actuator 110 as to meet the requirement of the formula shown below.

[Formula 2]

$$T_{OUT} \leq T_{BRK} - F1 \times L1 \quad (2)$$

The generated torque $T_{out}$ of the actuator 110 can be detected as coil current supplied to the actuator 110. FIG. 27 is a schematic illustration of an exemplary result of torque detection when the threshold value of the load torque as expressed by the coil current is 2.5 A and the period of time for which the threshold value can continue is 2.0 seconds. When the electric current value is sampled continuously, there arises a chattering problem. More specifically, if the coil current exceeds 2.5 A for 2.0 seconds, the counter is reset each time the coil current falls under the threshold value due to chattering so that the critical time for detection can be missed. If the period of time for which the coil current goes under the threshold value is very short (e.g., less than 4.0 milliseconds), it may be so arranged that the counter disregards such a situation and keeps on counting.

On the other hand, as for the impact load, or the AC component of the load, the inventors of the present invention came to find that the change in the kinetic energy applied to the output shaft of the motor is proportional to the product obtained by multiplying the torque applied to the motor by the angular velocity. Additionally, since the kinetic energy is substantially equal to the strain energy applied to the output shaft member, it is possible to detect the load torque that corresponds to the impact on the basis of the change in the kinetic energy by utilizing this equality and recognize that the AC component of the load is excessive in response to the load torque that exceeds the threshold value for causing the member to be broken.

Figure 24:
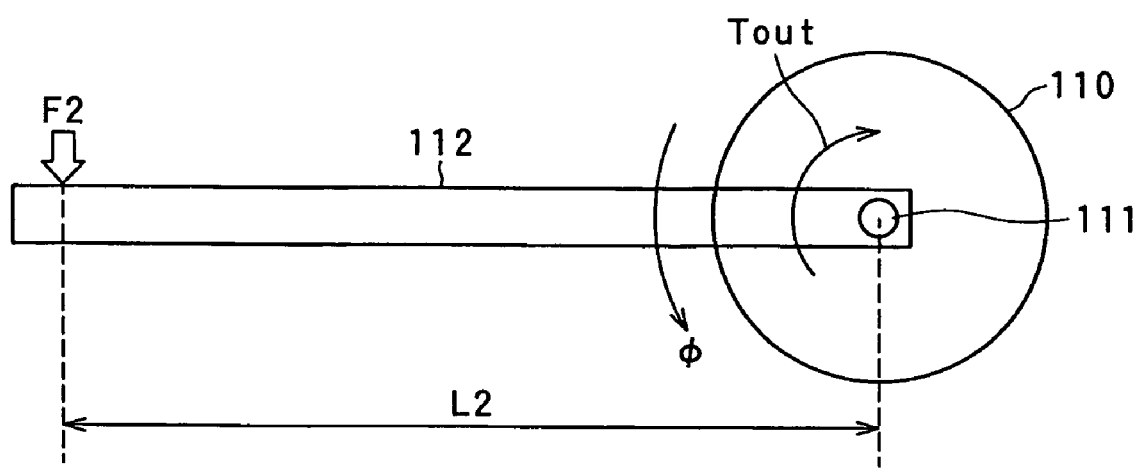
FIG. 24 is another schematic illustration of the mechanism of load absorption according to the invention.

For example, if an object falls on the link 112 at a position of the other end separated from the output shaft 111 by distance L2 as shown in FIG. 24 and hence a load torque is applied to the other end to force the link 112 to rotate in response to the impact, then such a load torque corresponds to the AC component of the load and hence will be referred to as "dynamic load torque" hereinafter.

If the kinetic energy applied to the link 112 by the dynamic load torque is $K_E$, the rotary angle of the link 112 that is forced to rotate is ø and the moment of inertia of the link 112 is J, they satisfy the requirement of the formula below.

[Formula 3]

$$K_E = \frac{1}{2} \times J \times \dot{\phi}^2 \quad (3)$$

Thus, assuming that all the kinetic energy $K_E$ is conveyed to the actuator 110 by way of the output shaft 111 and transformed into strain energy, the kinetic energy is absorbed as strain energy of the different members of the actuator 110 so that the actuator 110 is not subjected to any breakage if the strain energy is found within the elasticity range of the actuator 110 and hence absorbable. On the other hand, the actuator 110 can be damaged if the strain energy goes into the plasticity range out of the elasticity range.

Therefore, it is possible to prevent the actuator 110 from being damaged by such a dynamic load torque by controlling and lowering the generated torque $T_{out}$ of the actuator 110 whenever the strain energy becomes large so as to exceed the elasticity range of the members of the actuator 110.

The formula below is obtained when the above formula (3) is differentiated once by time t in order to detect the change in the quantity of the kinetic energy $K_E$ of the dynamic load torque applied to the link 112.

[Formula 4]

$$\frac{d}{dt}(K_E) = J \times \ddot{\phi} \times \dot{\phi} = \tau \times \dot{\phi} \quad (4)$$

In the above formula (4), $T_{out}$ denotes the output torque of the actuator 110 as described above. Since the change in the quantity of energy is proportional to the product of multiplication of the torque applied to the motor by the angular velocity of the motor, it is possible to detect the load torque on the basis of the change in the quantity of energy and to recognize that the AC component of the load is excessive when the load torque exceeds the threshold value for breaking any of the members of the motor.

Since the AC component of the load torque is impulsive (see FIG. 22), it can instantaneously get to the overload range and would not wait for the load absorbing operation to proceed in success. As pointed out above, when the arrangement for detecting an overload directly relies on the property that the change in the quantity of energy is proportional to the product of multiplication of the torque applied to the motor by the angular velocity, it is not possible to detect the overload until the torque gets to the overload range. Thus, the responsiveness of such an arrangement is unsatisfactory.

Therefore, according to the invention, the energy is differentiated twice on the time axis to observe the rate at which the energy changes instead of simply observing the change in the quantity of energy. Then, the torque is expected to get to the overload range when the ratio exceed a predetermined level so that the load absorbing operation can be carried out with an improved level of responsiveness. The formula below is obtained when the above formula (4) is differentiated for another time on the time axis (in other words, the formula (3) for the energy is differentiated twice by time t).

[Formula 5]

$$\frac{d^2}{dt^2}(K_E) = \dot{\tau} \times \dot{\phi} + \tau \times \ddot{\phi} \tag{5}$$

The formula (5) above indicates the acceleration of the change in the kinetic energy $K_E$. When the right side of the equation (5) is computed and found to exceed the predetermined threshold value that defines the boundary between the elasticity range and the plasticity range of the members of the actuator 110, the actuator 110 is prevented from being broken by controlling and lowering the generated torque $T_{out}$ of the actuator 110 in advance.

Note, however, the operation of computing a secondary differential like that of the second term of the right side of the above equation (5) is cumbersome. Additionally, the inventors of the present invention have empirically found as a result of experiments that the second term contributes only little to the outcome of the computation of the entire equation. Therefore, the second term of the right side of the equation (5) is omitted and the equation is approximated by multiplying the first term of the right side by a predetermined constant of proportion $G_K$. Thus, an evaluation function f(t) as expressed by the formula below is introduced.

[Formula 6]

$$f(t) = G_k \times \dot{\tau} \times \dot{\phi} \tag{6}$$

Figure 34:
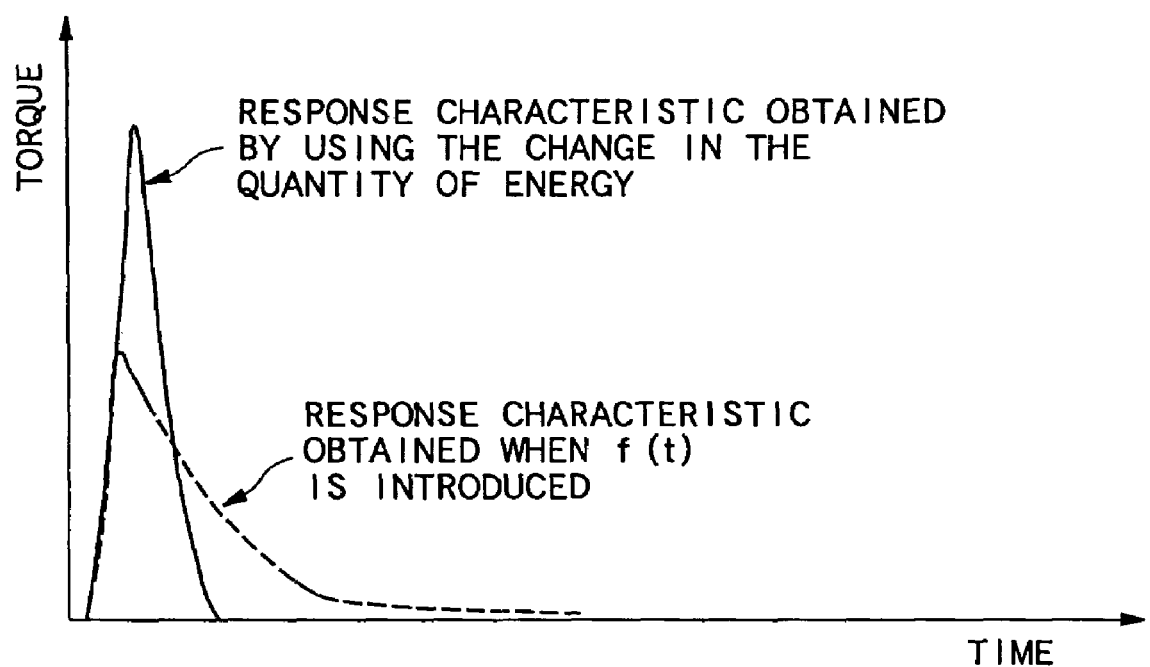
FIG. 34 is a graph illustrating the response characteristic of the load absorption mechanism when the change in the quantity of the kinetic energy $K_E$ is used and that of the load absorption mechanism when an evaluation function f(t) is introduced.

Thus, the actuator 110 can be prevented from being broken by controlling and lowering the generated torque $T_{out}$ of the actuator 110 in advance when the outcome of the computation of the evaluation function f(t) exceeds the above described threshold value. FIG. 34 is a graph illustrating in comparison the response characteristic of the load absorption mechanism when the change in the quantity of the kinetic energy $K_E$ is used and that of the load absorption mechanism when the evaluation function f(t) is introduced. As seen from FIG. 34, an overload state can be detected highly sensitively at a stage where the generated torque is relative low when the evaluation function is used.

The control substrate 77 operates on the above-described principle as a load absorbing means for preventing the actuators $A_1$ through $A_{24}$ of the robot 1 from being broken by the static load torque and the dynamic load torque as described above by referring to FIGS. 23 and 24. As shown in FIG. 16, the printed circuit board of the control substrate 77 is provided at a side thereof with a voltage detecting section 82 for detecting the magnitude of the electric current $I_{R1}$ that flows the power supply line LIN for the drive circuit 81 as voltage $V_j$.

The voltage detecting section 82 is formed by using a first resistor $R_1$ arranged as part of the power supply line LIN for the drive circuit 81 and a differential amplifier 84 comprising second through fifth resistors $R_2$ through $R_5$ and an operational amplifier 83 so that the voltage fall $V_j$ at the first resistor $R_1$ is detected by the differential amplifier 84 and the result of the detection is transmitted to the control IC 80 as voltage detection signal S11.

Since the voltage $V_j$ is proportional to the electric current $I_{R1}$ that flows through the resistor $R_1$ and also to the left side of the above formula (1), it also is proportional to the left side of the above formula (1). If the constant of proportion is $K_{Vi}$, the following equation holds true for the constant of proportion.

[Formula 7]

$$F1 \times L1 + T_{OUT} = K_{Vi} \times V_i \leq T_{BRK} \tag{7}$$

Thus, the actuators $A_1$ through $A_{24}$ are prevented from being broken by the static load torque by so controlling the PWM control section 91 as to constantly satisfy the formula below.

[Formula 8]

$$V_i \leq \frac{T_{BRK}}{K_{Vi}} \tag{8}$$

Figure 25:
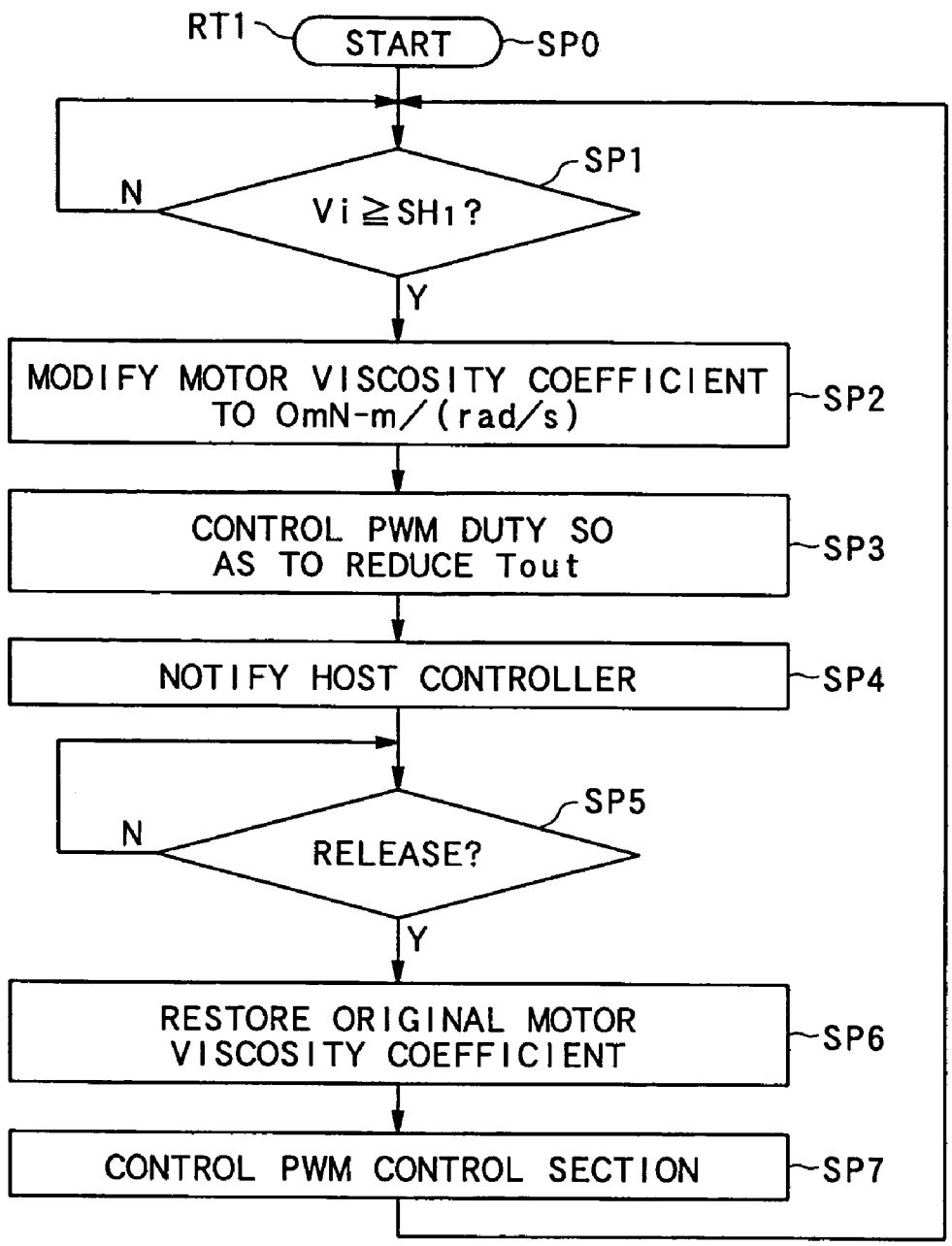
FIG. 25 is a flow chart of the first load absorption processing sequence RT1 that processing section 90 of control IC 80 according to the invention follows for execution.

FIG. 25 is a flow chart of the first load absorption processing sequence RT1 that the processing section 90 of the control IC 80 follows for execution. When a static load torque, or the DC component of a load, is applied to any of the actuators $A_1$ through $A_{24}$, by way of the corresponding link, the processing section 90 follows the processing sequence RT1 to prevent the actuators $A_1$ through $A_{24}$ from being broken by controlling the PWM control section 91 on the basis of the voltage detection signal S11 supplied from the voltage detecting section 82 in such a way that the voltage $V_1$ does not go above the predetermined first threshold value SH1 ($T_{BRK}/K_{Vi}$ of the above formula (8)).

The processing section 90 starts the operation of Step SP0 of the first load absorption processing sequence RT1 in parallel with the position controlling operation of the corresponding motor section 60 according to the operation command COM given to it from the host controller in a manner as described earlier. Then, in the next Step SP1, it determines if the voltage $V_j$ obtained according to the voltage detection signal S11 supplied from the voltage detecting section 82 is greater than the first threshold value SH1 or not. If the processing section 90 obtains a negative result in Step SP1, it repeats the operation of Step SP1 until it gets a positive result.

As the processing section 90 obtains a positive result in Step SP1 because a static load torque is applied to the corresponding link as a result of that the link abuts a wall or an external object, it proceeds to Step SP2 to control the PWM control section 91 and increase the extent of compliance of the corresponding motor section 60 by modifying the duty ratio of the BRAKE_PWM control signal S14 to 0[mN-m/(rad/s)]. Then, in the next step, or Step SP3, the processing section 90 controls the PWM control section 91 so as to reduce the effective values of the electric currents flowing to the coils 68$u$, 68$v$, 68$w$ of the motor section 60 in order to reduce the generated torque T$_{out}$.

Subsequently, the processing section 90 proceeds to Step SP4, where it notifies the host controller of the fact that the load absorption process (Step SP2 and Step SP3) is executed and then moves to the subsequent step, or Step SP5, where it waits for reception of a notification from the host controller telling that it should get out of the impact absorption process.

If the processing section 90 obtains a positive result in Step SP5 as it receives the notification from the host controller, it proceeds to Step SP6, where it controls the PWM control section 91 so as to restore the original value of the duty ratio of the BRAKE_PWM control signal S14, or the coefficient of viscosity of the motor, in order to return the extent of compliance of the motor section 60 to the level before the detection of the impact. Then, it proceeds to Step S7, where the original effective values of the drive currents I$_u$, I$_v$ and I$_w$ that are applied respectively to the coils 68$u$, 68$v$ and 68$w$ of the motor section 60 are restored so as to make the generated torque T$_{out}$ take the predetermined value. Then, the processing section 90 returns to Step SP1 to repeat the above sequence.

In this way, when a static load torque is applied to the link of any of the motors, the processing section 90 controls the coefficient of viscosity and the generated torque T$_{out}$ of the motor section 60 of the corresponding one of the actuators A$_1$ through A$_{24}$.

Meanwhile, the output torque T of the actuators A$_1$ through A$_{24}$ as expressed in the above formula (6) is proportional to the electric current I$_{R1}$ that flows through the resistor R$_1$ of the voltage detecting section 82 and the electric current I$_{R1}$ is proportional to the voltage fall V$_j$ of the resistor R$_1$ as pointed out above, the formula (6) can be modified to the formula below, using constants of proportion K$_i$, K$_θ$.

[Formula 9]

$$f(t) = G_k \times \dot{t} \times \dot{\phi} = G_k \times \frac{d\tau}{dt} \times \frac{d\phi}{dt} \quad (9)$$
$$= K_i \times \frac{dV_j}{dt} \times K_\theta \times \frac{d\phi}{dt}$$

As obvious from the above formula (9), the value of the evaluation function f(x) that is defined by the above formula (6), which may vary incessantly, can be determined as the product of multiplication of the product obtained by multiplying the change with time of the voltage V$_j$ as detected by voltage detecting section 82 by the constant of proportion K$_i$ by the product obtained by multiplying the change with time of the rotary position $\phi$ of the rotor shaft 64 of the motor section 60 as detected by the encoder 76 by the constant of proportion K$_θ$.

Figure 26:
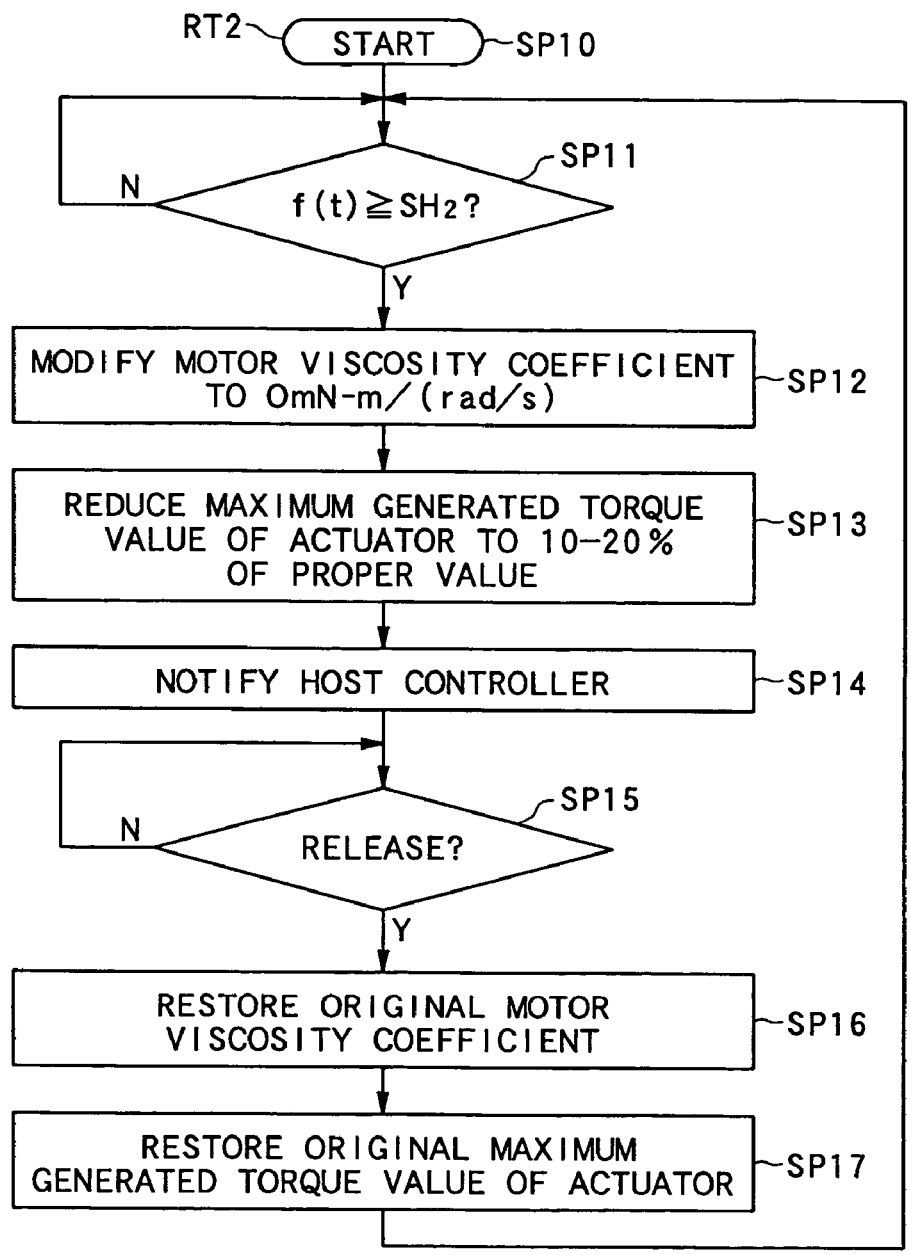
FIG. 26 is a flow chart of the second load absorption processing sequence RT2 that processing section 90 of control IC 80 according to the invention follows for execution.

FIG. 26 is a flow chart of the second load absorption processing sequence RT2 that the processing section 90 in the control IC 80 follows for execution. When a dynamic load torque, or the AC component of a load, is applied to any of the actuators A$_1$ through A$_{24}$, by way of the corresponding link, the processing section 90 follows the processing sequence RT2 to prevent the actuators A$_1$ through A$_{24}$ from being broken by controlling the PWM control section 91 on the basis of the voltage V$_j$ obtained according to the voltage detection signal S11 supplied from the voltage detecting section 82 and the rotary position $\phi$ of the rotor shaft 64 of the motor section 60 obtained from the first and second position detection signal S10A, S10B given from the encoder 76 in such a way that the value of the evaluation function f(t) does not go above the predetermined second threshold value SH2.

The processing section 90 starts the operation of Step SP10 of the second load absorption processing sequence RT2 in parallel with the first load absorption processing sequence RT1. Then, in the next Step SP11, it carries out the processing operation of the above formula (9) according to the voltage detection signal S11 from the voltage detecting section 82 and the position detection signals S10A, S10B from the encoder 76 and, at the same time, judges if the outcome of the processing operation is greater than the second threshold value SH2 or not. Note that 1.0 is selected for K$_i$ and 4.0 is selected for K$_θ$ in the above formula (9), while the second threshold value SH2 is determined to be within a range between 1.3 and 4.0[mN-m·rad/S$^2$], which is believed to be optimal on the basis of experiments. The processing section 90 repeats the operation of Step SP11 until it gets a positive result.

As the processing section 90 obtains a positive result in Step SP11 because an impact is applied to the corresponding link, it proceeds to Step SP12 to control the PWM control section 91 and increase the extent of compliance of the corresponding motor section 60 by modifying the duty ratio of the BRAKE_PWM control signal S14 to 0[mN-m/(rad/s)]. Then, in the next step, or Step SP13, the processing section 90 controls the PWM control section 91 so as to make the maximum value of the target torque as computed according to the operation command from the host controller equal to 10 to 20[%] of the properly computed value and produce the generated torque T$_{out}$.

Subsequently, the processing section 90 proceeds to Step SP14, where it notifies the host controller of the fact that the load absorption process (Step SP12 and Step SP13) is executed and then moves to the subsequent step, or Step SP15, where it waits for reception of a notification from the host controller telling that it should get out of the impact absorption process.

If the processing section 90 obtains a positive result in Step SP15 as it receives the notification from the host controller, it proceeds to Step SP16, where it controls the PWM control section 91 so as to restore the original value of the duty ratio of the BRAKE_PWM control signal S14, or the coefficient of viscosity of the motor, in order to return the extent of compliance of the motor section 60 to the level before the detection of the impact. Then, it proceeds to Step SP17, where the original effective values of the drive currents I$_u$, I$_v$ and I$_w$ that are applied respectively to the coils 68$u$, 68$v$ and 68$w$ of the motor section 60 are restored so as to make the generated torque T$_{out}$ take the predetermined value. Then, the processing section 90 returns to Step SP11 to repeat the above sequence.

In this way, when a dynamic load torque is applied to the link of any of the motors, the processing section 90 controls the coefficient of viscosity and the generated torque T$_{out}$ of the motor section 60 of the corresponding one of the actuators A$_1$ through A$_{24}$.

With the above described arrangement, when a static or dynamic load torque is applied to the link that is coupled to the output shaft 75 of any of the actuators A$_1$ through A$_{24}$ of the robot 1 so that the actuator can be broken, the extent of compliance of the actuators A$_1$ through A$_{24}$ is improved and, at the same time, the link is displaced so as to follow the load torque as a result of the fall of the output torque of the actuators $A_1$ through $A_{24}$.

Figure 1:
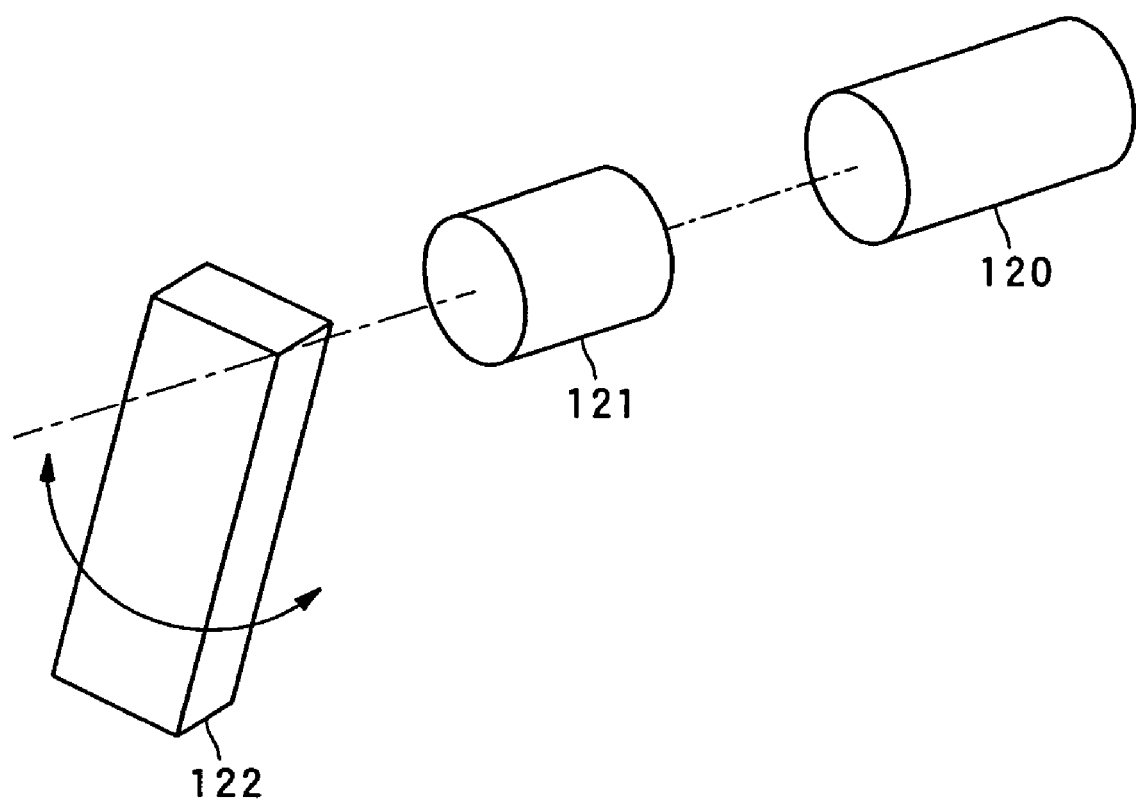
FIG. 1 is a schematic conceptual illustration of the operation of driving a movable section of a known robot.
Figure 2:
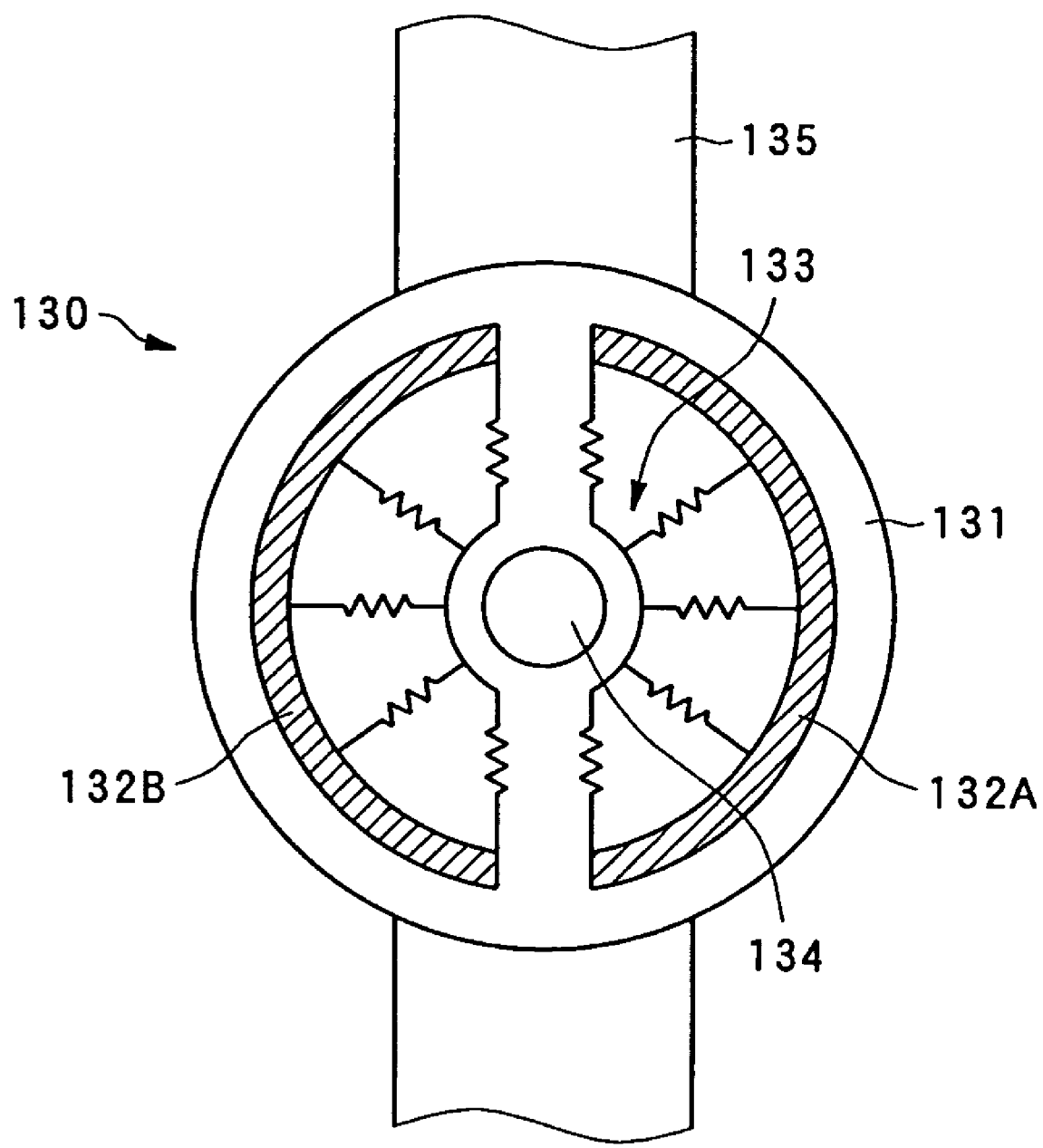
FIG. 2 is a conceptual view schematically illustrating the configuration of a known torque limiter.

Thus, according to the invention, it is possible to prevent the actuators $A_1$ through $A_{24}$ from being broken as in the case of the use of conventional torque limiters 130 as described above by referring to FIG. 1, while the load absorption is realized only by controlling the electric actuators $A_1$ through $A_{24}$. If compared with the use of conventional mechanical torque limiters 130, the performances of the actuators $A_1$ through $A_{24}$ that operate for load absorption according to the invention show little variances and are less affected by temperature.

The load absorption can be controlled by the control IC 80 that operates for ordinary positional control of the actuators $A_1$ through $A_{24}$. In other words, no additional component is required for the load absorption and the arrangement of using actuators $A_1$ through $A_{24}$ is simple if compared with the use of mechanical torque limiters 130. Additionally, the actuators $A_1$ through $A_{24}$ weigh less than the torque limiters 130.

Thus, with the above described arrangement, the actuators $A_1$ through $A_{24}$ are controlled in such a way that the sum of the absolute value of the static load torque applied additionally to any of the links coupled to the output shaft 75 of the corresponding one of the actuators $A_1$ through $A_{24}$ and that of the generated torque of the actuators $A_1$ through $A_{24}$ is detected as voltage $V_i$ and the generated torque is reduced when the sum goes above the predetermined first threshold value SH1. On the other hand, the change in the quantity of energy of the dynamic load torque applied to the link is detected and the actuators $A_1$ through $A_{24}$ are controlled in such a way that the generated torque is reduced when the detected change in the quantity of energy goes above the predetermined second threshold value SH2. Thus, if compared with the use of conventional mechanical torque limiters 130, the performances of the actuators $A_1$ through $A_{24}$ that operate for load absorption according to the invention show little variances and are less affected by temperature so that it is possible to build a highly operable load absorption system.

Additionally, when a load absorption system is built according to the invention, the entire system comprising the actuators $A_1$ through $A_{24}$ is simple and light weight as a whole if compared with an arrangement using conventional mechanical torque limiters 130.

E. Over-current Protection Mechanism of the Entire Robot

When an overload is applied to the shaft of one of the actuators/motors of the load absorption system comprising the actuators $A_1$ through $A_{24}$ as described above, both the AC component and the DC component of the load are appropriately absorbed so that any of the members of the system such as the motor and/or the link coupled to the output shaft of the motor are protected against damage and the damage, if any, is prevented from extending to other members.

When an excessive load torque is applied to one of the joints of the robot 1, an over-current can flow to the actuators for driving the joint in order to operate according to the command value given to them. Then, the overload can make any of the actuators faulty and the over-current can give rise to abnormality to the power source so as to consequently bring the robot into trouble.

A multi-joint type robot, which may be a legged mobile robot, comprises a plurality of motors for joint actuators and links coupled to the respective output shafts of the motors. If each of the motors successfully avoids an over-current state by itself, there may be occasions where the drive power source for driving the robot falls into an over-current state when judged on the basis of a plurality of motors. Therefore, it may be necessary to protect the robot against over-currents as a whole apart from the necessity of over-current protection for each of the motors.

Thus, according to the invention, it is so arranged as to monitor the over-current state of each motor and that of two more than two motors when put together by seeing the total current value of the motors being monitored in parallel with absorption of both the static load torque and the dynamic load torque of each actuator/motor. Additionally, it is so arranged as to check if each of the predetermined unit members including the arm sections and the leg sections of the robot is in an over-current state or not and also if the entire robot is in an over-current state or not, while each of the motors are not in an over-current state.

If any of the motors is detected to be in an overload state or an over-current state is detected for a motor or a combination of a plurality of motors, a protective operation is conducted for the motor or the motors, although the operation may vary depending on the over-current state. When an over-current is detected for a combination of a plurality of motors, a protective operation is conducted not for individual actuators but for the entire machine in order to avoid dangers that may arise as a result of the over-current state. The protective operation may be breaking the supply of electric current to the related group of motors or the entire machine, deprivation of power from the related group of motors or the entire machine and/or protection of the memory against the possible loss of memory due to the break of the supply of electric current. A motor may be deprived of power by reducing the generated torque to nil and/or by regulating the gain and reducing the viscous resistance of a motor.

Figure 28:
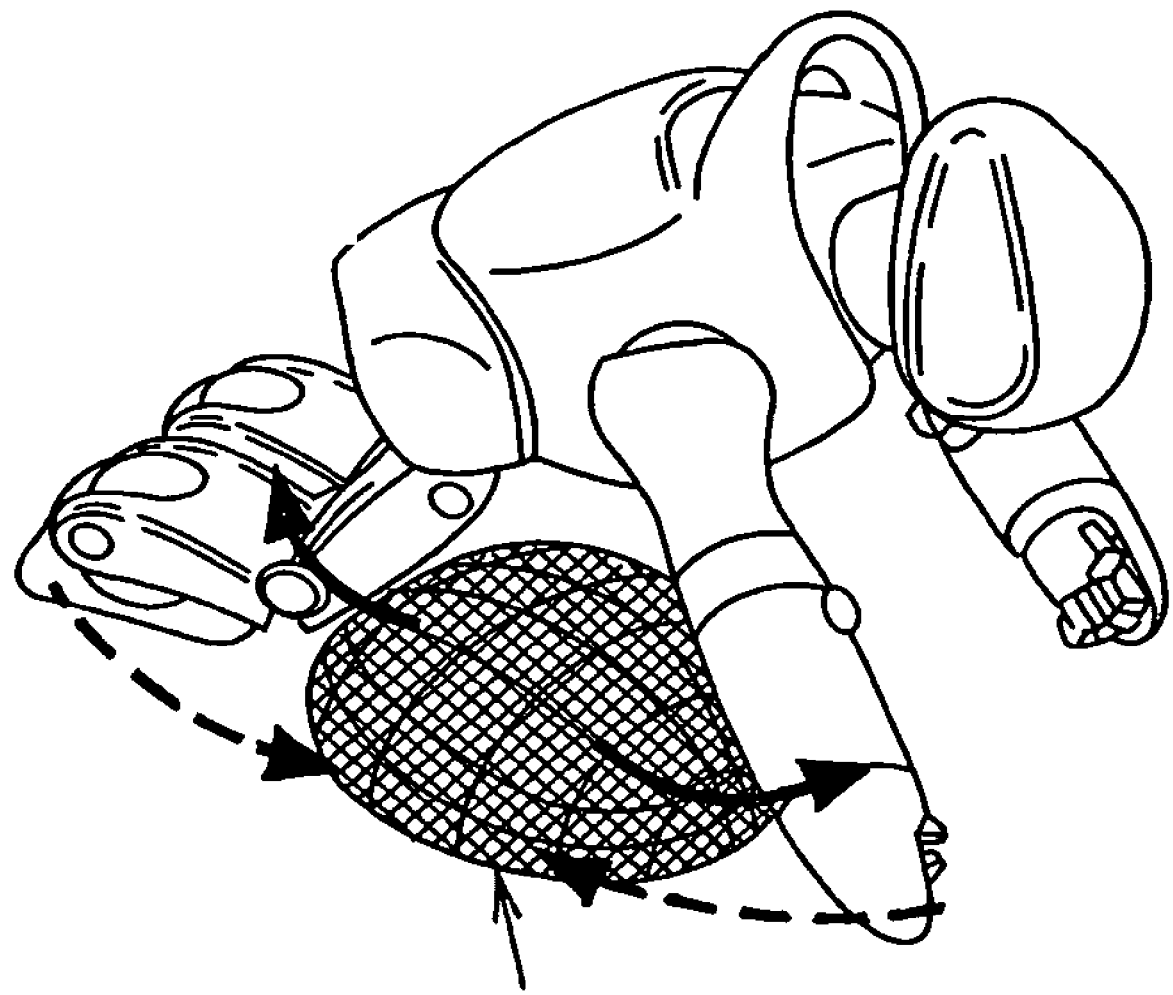
FIG. 28 is a schematic illustration of an operation of pinching a foreign object between the two legs of the robot 1 on the way of a motion of standing up from a state of lying on the face.

If the robot 1 is in an operation of standing up from a state of lying on the face and the two legs touch an obstacle shaded in FIG. 28, it will receive reaction force as indicated by the solid arrows in FIG. 28 provided that it tries to keep on its operation. Then, as a result, the right shoulder joint pitch axis, the right hip joint roll axis, the right hip joint pitch axis and the right ankle joint pitch axis are subjected to a load. While each single axis may not be subjected to a load that is large and damage it, the frame of the machine body can be plastically deformed and/or the cover can be damaged. Additionally, the motor currents can increase due to the excessive load applied to the actuators of the joint axes. Then, consequently the electric current to a single motor or the sum of the electric currents to a plurality of motors can increase to give rise to an over-current state.

According to the invention, such a state is detected by monitoring the electric current that is consumed by the load of the actuator of each of the axes of each joint and the total sum of the electric currents consumed by the joints of the robot is computed by the host control system to monitor the load of the entire machine body.

More specifically, the load torque $T_i$ of the axis of the i-th single motor is monitored by way of the voltage being applied to the motor i, or $T = K_{Vi} \cdot V_i$ that is derived from the formula (7). Therefore, if the k-th actuator is $A_k$ (note that $1 \leq k \leq 24$ in this embodiment) and its load torque is $T_k$, the sum $T_{sum}$ of the load torques of the entire robot is expressed by the formulas below. Additionally, the motor current $I_i$ of the i-th motor is computed by means of formula $I_i = V_i/R$, using the voltage fall in the motor i. When computing the load torques, the sum $I_{sum}$ of the motor currents of the entire robot is also computed.

[Formulas 10]

$$T_{sum} = \sum_{k=1}^{24} T_k \quad (10)$$

$$I_{sum} = \sum_{k=1}^{24} I_k$$

When the robot operates to stand up from a state of lying on the face by means of the two hands pressed against the floor as shown in FIG. 28, a large load is applied to the pitch axes actuators $A_5$ and $A_9$ of the left and right shoulder joints, the roll axes actuators $A_{14}$ and $A_{20}$ of the left and right hip joints, the pitch axes actuators $A_{15}$ and $A_{21}$ of the left and right hip joints and the roll axes actuators $A_{17}$ and $A_{23}$ of the left and right ankle joints. Therefore, the above formulas (10) for the sum $T_{sum}$ of the load torques of the entire robot and the sum $I_{sum}$ of the motor currents of the entire robot can be paraphrased by using the respective formulas shown below. The sum $O(T_K)$ of the load torques of the remaining joint actuators can be disregarded.

[Formulas 11]

$$T_{sum} = \sum_{k=1}^{24} T_k \quad (11)$$

$$= (T_5 + T_9 + T_{14} + T_{20} + T_{15} + T_{21} + T_{17} + T_{23}) + O(T_k)$$

$$I_{sum} = \sum_{k=1}^{24} I_k$$

$$= (I_5 + I_9 + I_{14} + I_{20} + I_{15} + I_{21} + I_{17} + I_{23}) + O(I_k)$$

When the total load $T_{sum}$ lies above a predetermined threshold value for a predetermined period of time or when the total electric current $I_{sum}$ gets to a peripheral threshold value, a machine protection sequence, which may typically involves a shutdown of the machine and protection of the memory, will be followed to protect the robot against destruction.

Figure 29:
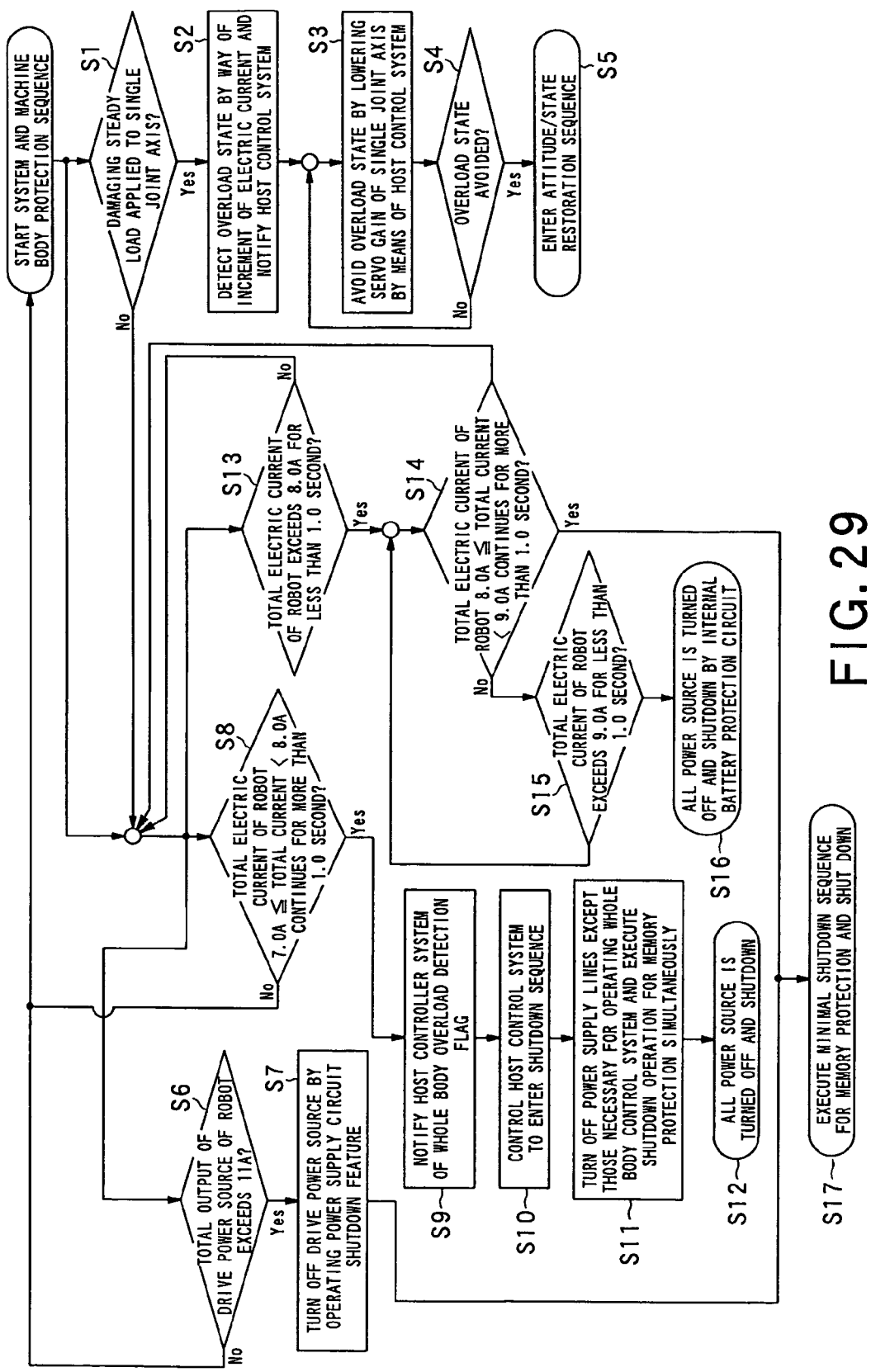
FIG. 29 is a flow chart of the processing sequence of a machine protecting operation that is carried out in response to a situation when an overload is detected on a single actuator motor shaft, when an overload is detected on a plurality of actuator motor shafts and when an over-current is detected and also in response to an overload state or an over-current state.

FIG. 29 is a flow chart of the processing sequence of a machine protecting operation that is carried out in response to a situation when an overload is detected on a single actuator motor shaft, when an overload is detected on a plurality of actuator motor shafts and when an over-current is detected and also in response to an overload state or an over-current state.

Referring to FIG. 29, firstly, it is checked if an impact load that can lead to damage is applied to any of the axes of a joint or not (Step S1). The evaluation function f(t) expressed by the formula (6) above can be used to detect if an impact load is applied to an actuator or not.

It is checked if the single axis of the joint is damaged or not by seeing the increment of the electric current to the actuator motor of the axis due to the increased load at the joint axis. More specifically, if a current value not smaller than 2.5 A is observed for not less than 2.0 seconds at the drive power source part (+12.0V) of the actuator, it is judged that an overload state exists. Note that the measures as described above by referring to FIG. 27 are taken as antinoise measures.

If it becomes apparent that an impact load is applied to an actuator by way of the increment of the motor current of the actuator, the load absorption mechanism of the actuator starts operating and tries to avoid an overload state (Step S2). More specifically, the processing section 90 in the control IC 80 follows the load absorption processing sequence RT2 illustrated in FIG. 26 to PWM-control the motor current $I_{R1}$ so that the value of evaluation function f(t) may not exceed the second threshold value SH2.

Then, the processing section 90 notifies the middleware layer (see FIG. 8) that controls the movement of the robot 1 of the load absorbing operation (Step S3).

If an overload state can be avoided (Step S4), the processing section 90 follows the sequence for restoring the attitude/state (Step S5).

Figure 30:
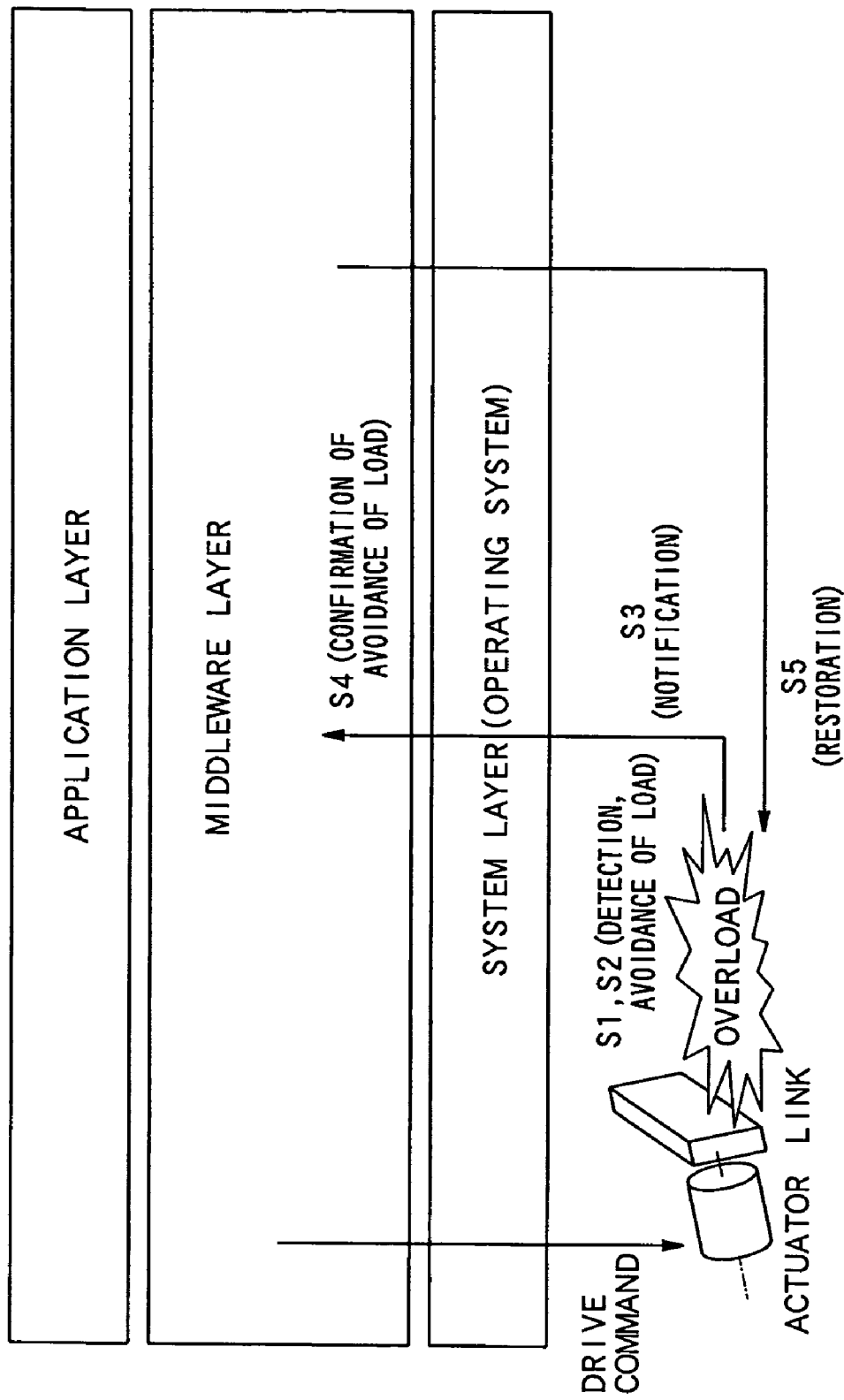
FIG. 30 is a schematic illustration of an operation that is carried out on the software for a load absorbing operation and a restoring operation when an impact load is applied to an actuator.

FIG. 30 is a schematic illustration of an operation that is carried out on the software for a load absorbing operation and a restoring operation when an impact load is applied to an actuator.

As the impact load applied in the actuator is detected (S1), the load absorption mechanism (see FIG. 26) in the actuator starts operating and tries to dissolve the overload state by PWM-controlling the motor current and regulating the coefficient of viscosity of the motor (S2). The operation control section 90 in the actuator notifies the host software, or the middleware layer, of the fact that the load absorption mechanism is operated (S3). When the middleware layer judges that an overload state is avoided (S4), it returns the control to the actuator (S5). Then, the actuator follows the sequence for restoring the attitude/state and restores the original coefficient of viscosity of the motor.

Now, the operation of load detection, that of detecting an over-current and that of machine body protection will be described by referring back to FIG. 29. If it is determined that no steady load that leads to damage is not applied to an axis of a joint (Step S1), the three conditions for an over-current are judged in parallel in Steps S6, S8 and S13. A shutdown operation will be carried out by following a predetermined sequence, which may vary depending on the degree of seriousness of the conditions.

In Step S6, it is checked if the output of the drive power source of the robot gets to a threshold value or not provided that the motor current of any single axis of any joint does not reach the threshold level of over-current. The drive power source of the robot of this embodiment is a battery and a protection circuit (battery IC) that is contained in or annexed to the battery monitors the output of the drive power source for a charging/discharging operation (see FIG. 33). The threshold value for the output of the drive power source is defined by the protection circuit of the battery itself and may typically be 11 amperes.

Thus, if the microcomputer that is monitoring the supply current of the robot judges that there is a serious power supply abnormality (Step S6), the shutdown feature in the power supply circuit is driven to operate and the drive power source is turned off (Step S7). Then, the minimal processing operations for protecting the memory and other components that are necessary for preserving the operating condition of the robot are carried out and the shutdown sequence is followed (Step S17).

In Step S8, it is checked if the sum of the electric currents of the entire robot meets the conditions of a light over-current or not provided that the motor current of any single axis of any joint does not reach the threshold level of over-current.

In this embodiment, the output of the drive power source from the battery, which operates as drive power source of the robot, is distributed to the actuators/motors distributed in the entire body of the robot, to the control modules (see FIG. 7)

and also to other electrically-driven modules by the power supply control circuit. The conditions of a light over-current as used herein are defined by the power supply control circuit and may typically be such that the output is not lower than 7 amperes but lower than 8 amperes continued for not shorter than 0.1 seconds.

Thus, as the microcomputer that is monitoring the supply current of the robot judges that there is a light power supply abnormality (Step S8), it notifies the middleware layer, which controls the movement of the robot 1, of the power supply abnormality (Step S9). Then, the middleware layer performs a control operation for following an ordinary shutdown sequence (Step S10). Then, it turns off the power source except the power supply line necessary for operating the control system of the entire body and, at the same time, carries out a shutdown operation necessary for protecting the memory and other components (Step S11). Subsequently, it turns off the entire power source and shuts it down (Step S12).

Figure 31:
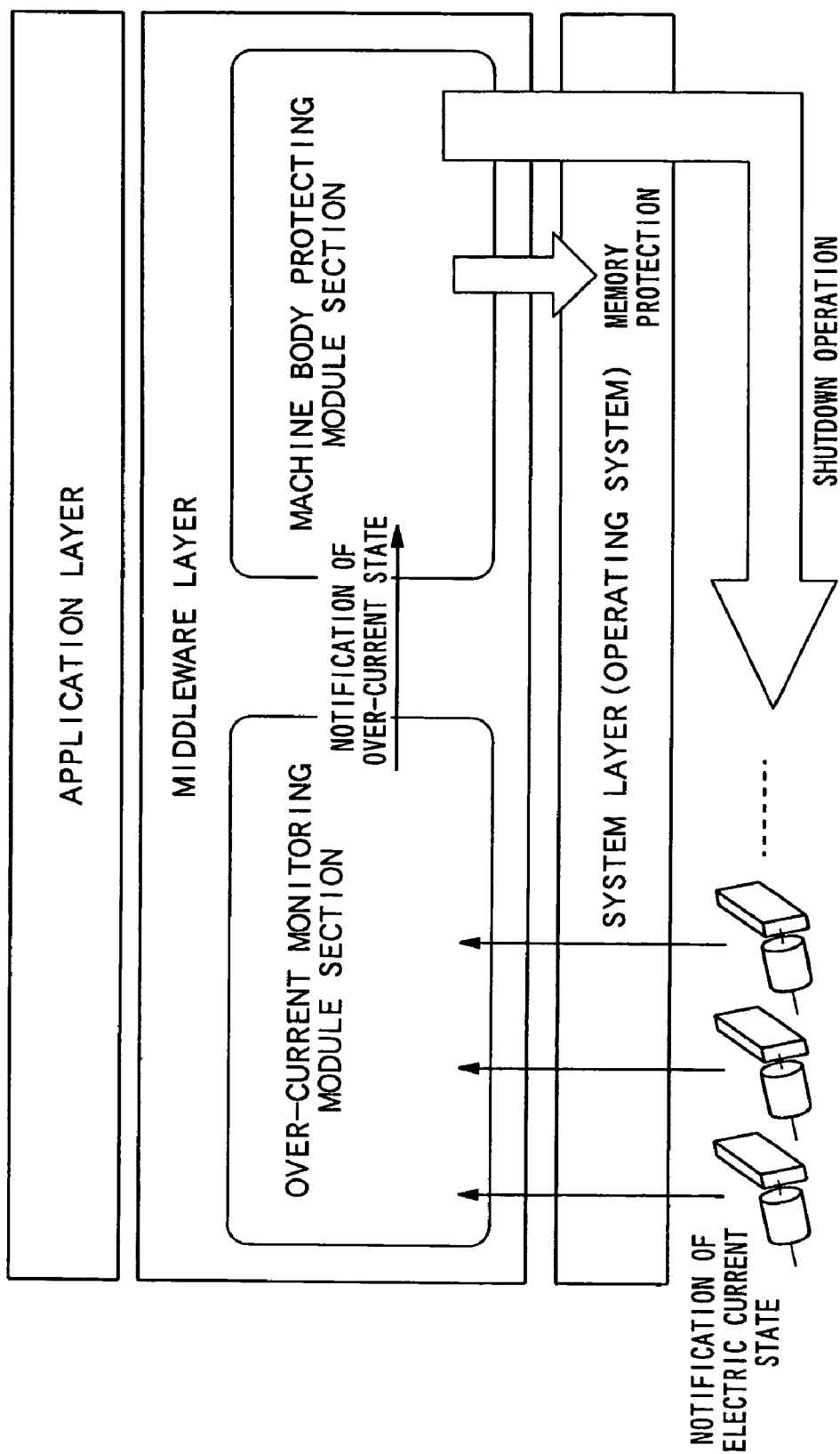
FIG. 31 is a schematic illustration of the configuration in the middleware layer of the arrangement for detecting an over-current state at all the joint axes and performing a shutdown operation.
Figure 32:
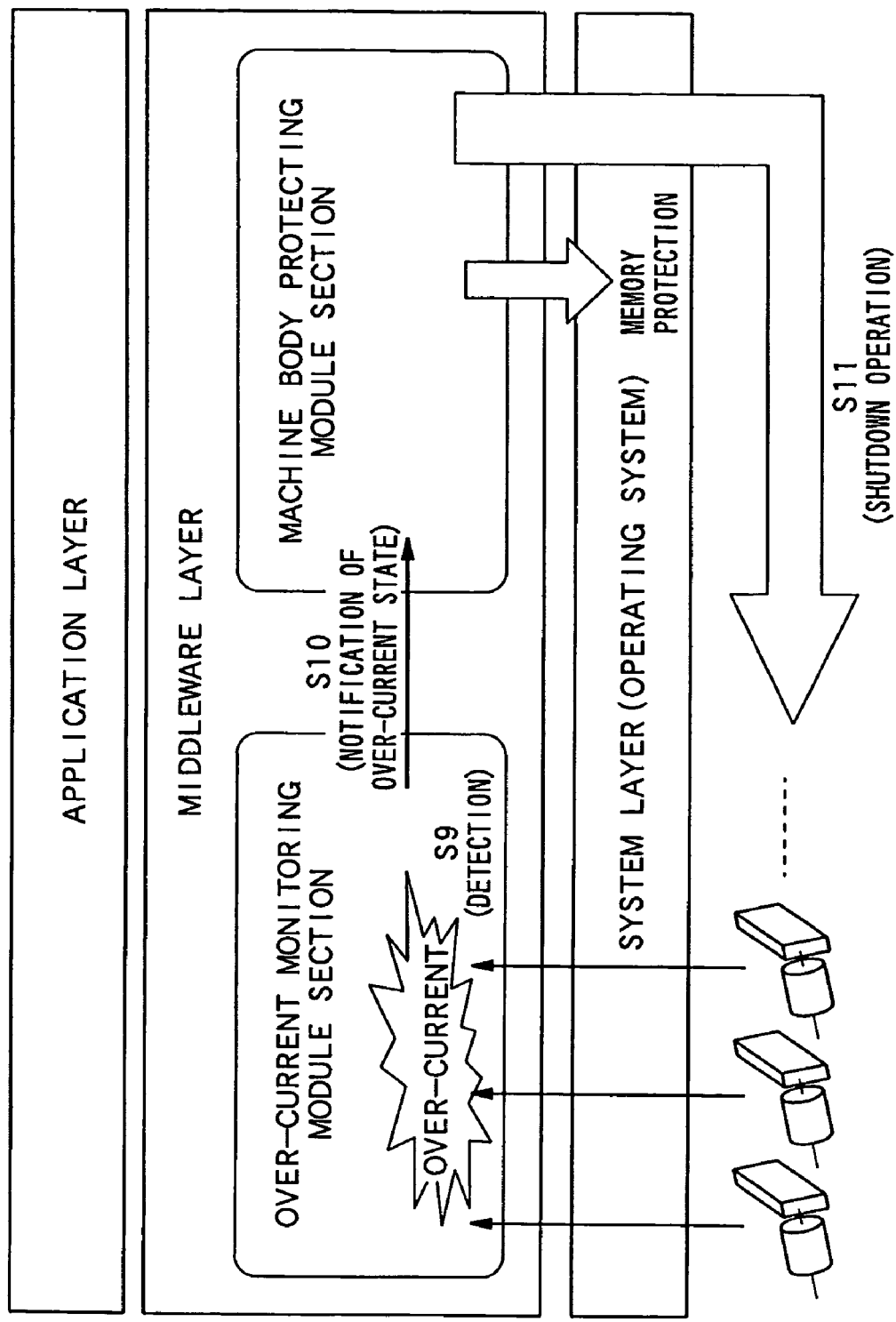
FIG. 32 is a schematic illustration of the configuration in the software of the arrangement for detecting an over-current state at the entire robot and performing a shutdown operation.

FIG. 31 is a schematic illustration of the configuration in the middleware layer of the arrangement for detecting an over-current state at all the joint axes and performing a shutdown operation. As shown in FIG. 32, an over-current monitoring module section and a machine body protecting module section are arranged in the middleware layer.

The over-current monitoring module section receives signals telling the states of the electric currents (e.g., motor currents $I_i$) simultaneously in parallel from all the actuators $A_1$ through $A_{24}$ and detects the state of the electric current of the entire machine according to the sum of the electric currents.

The machine body protecting module section starts executing a shutdown operation in response to the detection, if any, of an over-current state as detected by the over-current monitoring module section.

FIG. 32 is a schematic illustration of the configuration on the software of the arrangement for detecting an over-current state at the entire robot and performing a shutdown operation.

In the middleware layer, when the over-current monitoring module section detects an overload state of the entire robot on the basis of the input of the detected electric current values from the actuators for driving the joint axes (S9), it notifies the machine body protecting module section of the detected fact (S10). Then, in response to the notification, the machine body protecting module section issues a command for protecting the memory of the machine and executes a shutdown operation (S11).

Returning back to FIG. 29, now the operation of detecting the load, that of detecting an over-current and that of protecting the machine body will be described below. In parallel with Step S6 and Step S8, it is checked if the sum of the electric currents of all the joints of the entire robot has got to the most serious over-current state or not, provided that the electric current of each of the axes of the joints has not reached the over-current threshold value.

In this embodiment, the output of the drive power from the battery that operates as power source for driving the robot is distributed to the actuators/motors arranged throughout the entire body of the robot, the control modules (see FIG. 7) and the other electrically activated modules by the power supply control circuit. The conditions of a serious over-current as used herein are defined by the power supply control circuit and may typically be such that the output is not lower than 8.0 amperes (Step S13) and goes above 9.0 amperes within 1.0 second (Step S14).

Thus, as the power supply control circuit that is monitoring the supply current of the robot judges that there is a serious power supply abnormality (Step S8) that is heavier than a light power supply abnormality, it only protects the memory before it executes the shutdown sequence (Step S17).

In Step S15, it checks if the sum of the electric currents of all the joints of the entire robot meets the conditions of the most serious over-current state or not, provided that the electric current of each of the axes of the joints has not reached the over-current threshold value.

In this embodiment, the drive power source of the robot is a battery and a protection circuit (battery IC) that is contained in or annexed to the battery monitors the output of the drive power source for a charging/discharging operation. The conditions of a serious over-current as used herein are such that the output is not lower than 8.0 amperes and goes above 9.0 amperes within 1.0 second When the power supply protecting circuit judges that there is the most serious over-current state and suspends the power supply, the shutdown sequence that is the minimal sequence necessary for protecting the memory is not executed and the entire operation of the robot is completely and forcibly suspended (Step S16).

Thus, according to the invention, a stepwise circuit protection method is adopted for a robot system having a number of actuator drive circuits and a power supply circuit for supplying power to them. With the method, power supply abnormalities are classified into a category of serious power supply abnormality, a category of light power supply abnormality and a category of the most serious power supply abnormality. Such a stepwise circuit protection method is very effective because the process is simple and reliable.

While the present invention is described in detail by referring to the accompanying drawings that illustrate a preferred embodiment of the invention, it may be obvious to those skilled in the art that the embodiment can be modified or replaced in various different ways without departing from the scope of the invention.

The present invention is not limited to products referred to as "robots". In other words, the present invention is applicable to mobile machines and other general devices that show motions resembling those of man by utilizing electric or magnetic effects if such products belong to industries other than the robot industry such as toys.

While the present invention is described-above so as to be applied to a bipedal robot 1 as shown in FIGS. 3 through 7, the present invention is by no means limited thereto. In other words, the present invention can be broadly applied to robots of various other types and also to various other devices that utilizes servo motors as power sources for movable sections thereof.

While the control means of this embodiment is formed by arranging control ICs 80 that perform position control for the actuators $A_1$ through $A_{24}$ according to the operation command COM issued from the host controller and operate as means for detecting the sum of the absolute value of the static load torque applied additionally to any of the links coupled to the output shaft 75 of the corresponding one of the actuators $A_1$ through $A_{24}$ and that of the generated torque of the actuators $A_1$ through $A_{24}$ and also as control means for controlling the motor so as to reduce the generated torque when the sum goes above the predetermined first threshold value, the present invention is by no means limited thereto and such means for detecting the sum of the absolute values and such control means may be provided separately from the control ICs 80.

While the control means of this embodiment is formed by arranging control ICs 80 that perform position control for the actuators $A_1$ through $A_{24}$ according to the operation command COM issued from the host controller and operate as means for detecting the change in the quantity of energy of the dynamic load torque applied to each of the links coupled to the output shafts 75 of the actuators $A_1$ through $A_{24}$ and also as controls means for controlling the motor in question so as to reduce the generated torque when the change in the quantity of energy as detected by the means for detecting the change in the quantity of energy exceeds a predetermined threshold value, the present invention is by no means limited thereto and such means for detecting the change in the quantity of energy and such control means may be provided separately from the control ICs 80.

Additionally, while 1.0 and 4.0 are selected respectively for the constants of proportion $K_i$, $K_\theta$ as shown in the above formula (9) and a range of 1.3 to 4.0[mN·m·rad/S2] is selected for the second threshold value SH2 in the above description because its believed to be optimal by referring to the outcome of a series of experiments, the present invention is by no means limited thereto and various other values may be selected for the constants of proportion $K_i$, $K_\theta$ and the second threshold value SH2 depending on the structure of the actuators that are employed.

While the magnitude of the electric current $I_{R1}$ that flows through the power supply line LIN for the drive circuit 81 is detected as voltage $V_j$ and the change in the quantity of energy of the static load torque and the dynamic load torque applied to each of the links coupled to the output shafts 75 of the actuators $A_1$ through $A_{24}$ is detected on the basis of the detected voltage $V_j$ in the above description, the present invention is by no means limited thereto. What is essential here is to reliably detect the change in the quantity of energy of the static load torque and the dynamic load torque and any technique other than detecting the electric current $I_{R1}$ that flows through the power supply line LIN for the drive circuit 81 may alternatively be used for the purpose of the invention.

While the use of a circuit formed by utilizing a switching element comprising a bipolar transistor is described above for the purpose of controlling the switching operation of the coil current to the coil of each actuator/motor, the control circuit may be realized by using a MOSFET or some other semiconductor element as may be apparent to those skilled in the art.

While the present invention is described above mainly by referring to actuators/motors that are used as actuators for driving the joints of a robot, the present invention is by no means limited thereto. It is possible to provide the effects of the present invention by means of actuators of a type adapted to drive the joints of a robot by extending/contracting the distance of each link connecting the corresponding joint like muscles by way of servo gain control and viscosity control other than actuators/motors having a rotary shaft for directly driving the joint angle. Examples of joint drive actuators include shape memory alloy actuators, fluid actuators and polymer actuators.

In short, the present invention is described here only by way of an embodiment and the present invention is by no means limited to the description of the letter of specification. The present invention is defined only by the appended claims.

What is claimed is:

1. A robot having a plurality of movable joint sections, the robot comprising:
   a drive power source for driving the robot;
   a plurality of actuators adapted to operate by the supply current from the drive power source for respectively driving the plurality of movable joint sections;
   monitoring means for monitoring the output of the drive power source or the electric current supplied to different sections in the robot;
   power source abnormality detecting means for detecting any of a plurality of power source abnormal conditions according to the output of the power source as monitored by the monitoring means; and
   operation control means for conducting a protective operation corresponding to the power source abnormal condition detected by the power source abnormality detecting means,
   wherein the power source abnormality detecting means detects a light over-current state when a condition where the electric current being supplied to the different sections in the robot is higher than a first threshold value but lower than a second threshold value continues for more than a predetermined period of time; and
   wherein the operation control means carries out a predetermined shutdown operation and then suspends the operation of the drive power source in response to the light over-current state.

2. The robot according to claim 1, wherein
   the power source abnormality detecting means detects a serious abnormal condition of the power source as the output current of the drive power source exceeds a predetermined level; and
   the operation control means suspends the operation of the drive power source in response to the serious abnormal condition of the drive power source.

3. The robot according to claim 1, wherein
   the power source abnormality detecting means detects a heavier over-current state when a condition where the electric current being supplied to the different sections in the robot is higher than the second first threshold value for a period of time shorter than the predetermined period of time; and
   the operation control means carries out a minimal shutdown operation and then suspends the operation of the drive power source in response to the heavier over-current state.

4. The robot according to claim 3, wherein
   the power source abnormality detecting means detects the heaviest over-current state when a condition where the electric current being supplied to the different sections in the robot is higher than a third threshold value within a predetermined period of time after becoming higher than the second threshold value; and
   the operation control means immediately suspends the operation of the drive power source in response to the heaviest over-current state.

5. The robot according to claim 1, further comprising:
   a memory for storing control data;
   the shutdown operation including a memory protecting operation of protecting the contents of the memory.

6. The robot according to claim 5, further comprising:
   power supply lines of a plurality of systems for supplying an electric current to the different sections in the robot from the drive power source;
   the shutdown operation including an operation of turning off the power supply lines other than those necessary for the control operation of driving the robot and an operation of protecting the memory in a state where the power supply lines other than the necessary ones are turned off.

7. An over-current protection device for a robot, the robot comprising:
- a drive power source for driving the robot;
- a plurality of actuators adapted to operate by the supply current from the drive power source for respectively driving the plurality of movable joint sections;
- monitoring means for monitoring the output of the drive power source or the electric current supplied to different sections in the robot;
- power source abnormality detecting means for detecting any of a plurality of power source abnormal conditions according to the output of the power source as monitored by the monitoring means; and
- operation control means for conducting a protective operation corresponding to the power source abnormal condition detected by the power source abnormality detecting means,
  - wherein the power source abnormality detecting means detects a light over-current state when a condition where the electric current being supplied to the different sections in the robot is higher than a first threshold value but lower than a second threshold value continues for more than a predetermined period of time; and
  - wherein the operation control means carries out a predetermined shutdown operation and then suspends the operation of the drive power source in response to the light over-current state.

8. The device according to claim 7, wherein
the power source abnormality detecting means detects a serious abnormal condition of the power source as the output current of the drive power source exceeds a predetermined level; and
the operation control means suspends the operation of the drive power source in response to the serious abnormal condition of the drive power source.

9. The device according to claim 7, wherein
the power source abnormality detecting means detects a heavier over-current state when a condition where the electric current being supplied to the different sections in the robot is higher than the second threshold value for a period of time shorter than the predetermined period of time; and
the operation control means carries out a minimal shutdown operation and then suspends the operation of the drive power source in response to the heavier over-current state.

10. The device according to claim 9, wherein
the power source abnormality detecting means detects the heaviest over-current state when a condition where the electric current being supplied to the different sections in the robot is higher than a third threshold value within a predetermined period of time after becoming higher than the second threshold value; and
the operation control means immediately suspends the operation of the drive power source in response to the heaviest over-current state.

11. The device according to claim 7, wherein the robot further comprising:
a memory for storing control data;
the shutdown operation including a memory protecting operation of protecting the contents of the memory.

12. The device according to claim 11, wherein the robot further comprising:
power supply lines of a plurality of systems for supplying an electric current to the different sections in the robot from the drive power source;
the shutdown operation including an operation of turning off the power supply lines other than those necessary for the control operation of driving the robot and an operation of protecting the memory in a state where the power supply lines other than the necessary ones are turned off.

* * * * *